(12) United States Patent
Bilodeau et al.

(10) Patent No.: US 7,392,117 B1
(45) Date of Patent: Jun. 24, 2008

(54) DATA LOGGING, COLLECTION, AND ANALYSIS TECHNIQUES

(76) Inventors: James R. Bilodeau, 4326 Red Fox Pl., Loveland, CO (US) 80537; William A. Rhodes, 107 W. Abriendo Ave., Pueblo, CO (US) 81007

( * ) Notice: Subject to any disclaimer, the term of this patent is extended or adjusted under 35 U.S.C. 154(b) by 518 days.

(21) Appl. No.: 10/979,870

(22) Filed: Nov. 2, 2004

Related U.S. Application Data

(60) Provisional application No. 60/516,830, filed on Nov. 3, 2003.

(51) Int. Cl.
*G01B 7/24* (2006.01)
*B61C 17/00* (2006.01)

(52) U.S. Cl. .................. 701/19; 246/120; 246/121; 246/246

(58) Field of Classification Search ............. 701/19; 73/579; 340/679, 425.5; 374/141; 246/120, 246/121, 246, 70, 95, 107, 185
See application file for complete search history.

(56) References Cited

U.S. PATENT DOCUMENTS

| | | | |
|---|---|---|---|
| 4,701,866 A | 10/1987 | Harrison | .................... 364/550 |
| 4,755,238 A | 7/1988 | Deroche | |
| 5,098,080 A | 3/1992 | Arnone | |
| 5,161,891 A | 11/1992 | Austill | ........................ 374/141 |
| 5,386,727 A | 2/1995 | Searle | |
| 5,529,267 A | 6/1996 | Giras | |
| 5,680,054 A | 10/1997 | Gauthier | |
| 5,713,540 A | 2/1998 | Gerszberg | |
| 5,743,495 A | 4/1998 | Welles | |
| 5,786,750 A * | 7/1998 | Cooper | .................... 340/425.5 |
| 5,941,482 A * | 8/1999 | Santagata | .................... 246/428 |
| 5,992,241 A * | 11/1999 | Posgay et al. | ................. 73/779 |
| 6,026,687 A | 2/2000 | Jury | |
| 6,216,985 B1 | 4/2001 | Stephens | |
| 6,405,141 B1 | 6/2002 | Carr et al. | ..................... 702/36 |
| 6,434,452 B1 * | 8/2002 | Gray | ........................... 701/19 |
| 6,570,497 B2 | 5/2003 | Puckette | |
| 6,813,581 B1 * | 11/2004 | Snyder | ....................... 702/130 |
| 6,951,132 B2 | 10/2005 | Davenport | |
| 2001/0045495 A1 | 11/2001 | Olson | |
| 2004/0122569 A1 | 6/2004 | Bidaud | |
| 2006/0020375 A1 | 1/2006 | Harrison | |
| 2006/0059992 A1 | 3/2006 | Jury | |

OTHER PUBLICATIONS

Shier, "Wireless Options for the Pocket PC: A Tutorial," Pocket PC Magazine, Sep. 2003, p. 79.
Omega Engineering, The Temperature Handbook (Omega 1999) (excerpt).
Cook & Young, Advanced Mechanics of Materials (MacMillan 1985) (excerpt).
Beer & Johnston, Mechanics of Materials (McGraw Hill 1981) (excerpt).
"StressNet Solution" product web page, Salient Systems, Inc. (believed to be published at www.salientsystems.com in Oct. 2003)

* cited by examiner

*Primary Examiner*—Tuan C To

(57) ABSTRACT

A system and method for data logging, collection, and analysis techniques. Logging, collection, and analysis of data relating to the condition of a structure, such as a railway rail. Monitoring the neutral temperature of a railway rail.

16 Claims, 26 Drawing Sheets

DATA LOGGING, COLLECTION, AND ANALYSIS TECHNIQUES

CROSS REFERENCE TO PROVISIONAL APPLICATION

This application claims the benefit of provisional application Ser. No. 60/516,830 (entitled "Data Logging, Collection, and Analysis Techniques"), filed Nov. 3, 2003, and which is hereby fully incorporated by reference.

COMPUTER PROGRAM LISTING APPENDICES

Submitted as part of this disclosure are six compact discs for Appendices A, B, and C. Three CD-ROMs each contain the files listed in one of the Appendices A, B, and C, and each of these three CD-ROMs is submitted in duplicate (duplicate CD-ROMs are identical). The material on these compact discs is hereby fully incorporated by reference.

BACKGROUND AND SUMMARY

This disclosure describes various implementations of methods and/or systems relating to data logging, collection, and/or analysis techniques, as well as relating to other inventions disclosed herein. In one embodiment, the invention relates to a method of collecting and analyzing information relating to the condition of a particular structure. In another embodiment, the invention relates to a method of logging, collecting, and analyzing information relating to the condition of a particular structure, such as a continuously welded railway rail. Other features and uses of the systems, methods, and subject matter disclosed herein may be understood by reference to the full extent of this disclosure, including the following detailed description, the claims, any appendices, and the several drawings herein.

BRIEF DESCRIPTION OF THE DRAWINGS

The following brief description of the drawings should be read and interpreted with the understanding that the figures illustrate specific implementations of one or more of the inventions disclosed herein. The descriptions will therefore apply only to some embodiments of the inventions disclosed in this application. No part of this brief description should be interpreted as limiting the scope of any claimed invention in a manner not specifically required by the issued claims of this patent.

DETAILED DESCRIPTION

Figure 1:
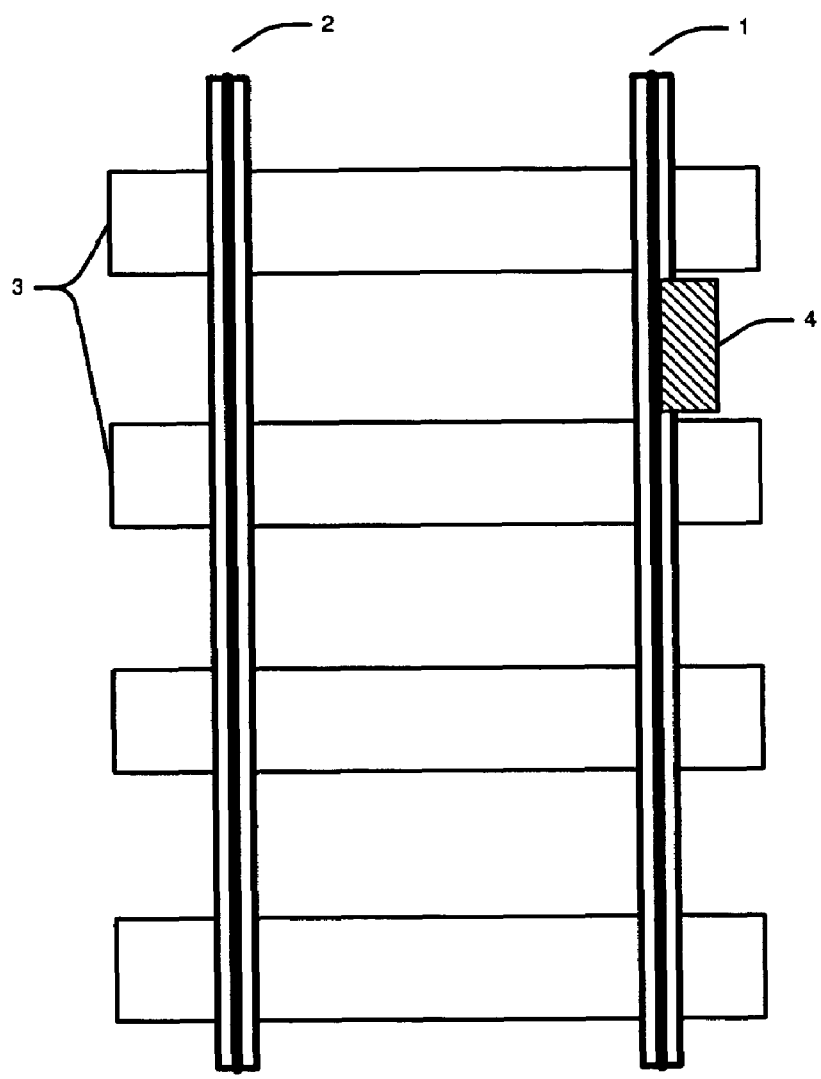
FIG. 1 is a diagram of a portion of railway and a field sensor system.

This application relates to a variety of inventions as disclosed herein, and should be read and interpreted with the understanding that various inventions are disclosed herein by describing, illustrating, or otherwise disclosing specific implementations of those inventions. Thus, any features, procedures, methods, systems, brief descriptions of the drawings, or other aspects described or illustrated herein are not intended to limit the scope of any claimed invention in a manner not specifically required by the issued claims of this patent.

In addition, the following disclosure should be read and interpreted as providing an adequate disclosure and written description for any single feature, procedure, method, system or other aspect of any of the disclosed subject matter, whether or not such single feature, procedure, method, system or other aspect has been described as being implemented separately. Similarly, the following disclosure should be read and interpreted as providing an adequate disclosure and written description for any partial implementation of the methods, systems, and/or apparatuses disclosed herein, whether or not such partial implementations have been specifically described or illustrated. None of the features, procedures, methods, systems, or other aspects of these specific implementations are an essential or required aspect or element of any claimed invention unless explicitly required by the claim directed to that invention. For example, although this disclosure outlines techniques for data logging, collection, and analysis, it should be understood that data logging, collection, and analysis are not all required aspects of any claimed invention unless explicitly required by the claim directed that invention.

Further, the following disclosure should be read and interpreted with the understanding that any feature, procedure, method, system, aspect, invention, or combination thereof that is described and/or illustrated in this disclosure may be combined with any other feature, procedure, method, system, or other aspect described and/or illustrated in this disclosure, even if such a combination is not shown or specifically described. This disclosure should be interpreted as providing an adequate disclosure and written description of any such combinations.

Various structures in our society are relied upon to maintain their integrity, shape, and useful function. Once constructed, however, these structures can be degraded by time, the elements and other factors. If severely degraded, undesirable and even catastrophic effects can result.

For example, one crucial structure that is subject to eventual detrimental changes and loss of integrity is the rail used to construct the railroads on which trains operate. Over time, weather conditions, railroad track maintenance, changes in the track sub-structure or even normal train operations can have an effect and degrade the structural integrity of railway rail to unsafe levels. In some situations, however, it is possible to monitor various characteristics of the rail, and determine whether the structural integrity of the rail is poor. Further, if monitored properly, it is possible in some situations to detect if conditions are such that a problem is likely to occur. If detected early enough, measures can be taken to avert problems.

FIG. 1 is a diagram of a portion of railway with rails 1 and 2 and ties 3. Mounted on rail 1 is a track or field sensor system 4, which can be used to monitor various characteristics and conditions of the rail. The field sensor system 4 is made up of various field sensor system components, which may include electronics, sensors, and other components to facilitate the measurement of various conditions of the rail 1. The field sensor system 4 collects data from the structure to be monitored, which in FIG. 1 is the rail 1. Data relating to the condition of the rail 1 is collected either continuously or periodically, and in some embodiments, the field sensor system 4 stores this data in a storage device or memory located within the field sensor system 4.

Figure 2A:
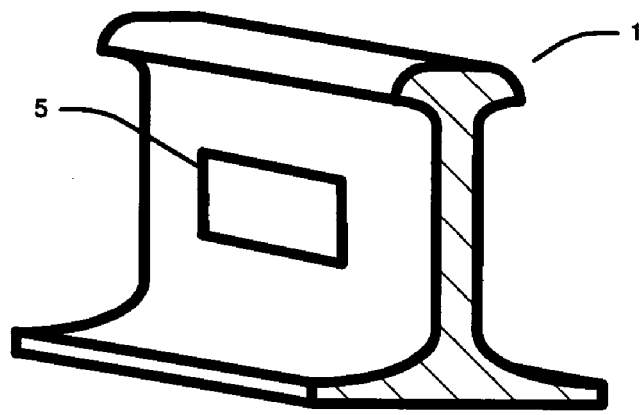
FIGS. 2a and 2b are cross sectional diagrams of both sides of a rail.
Figure 2B:
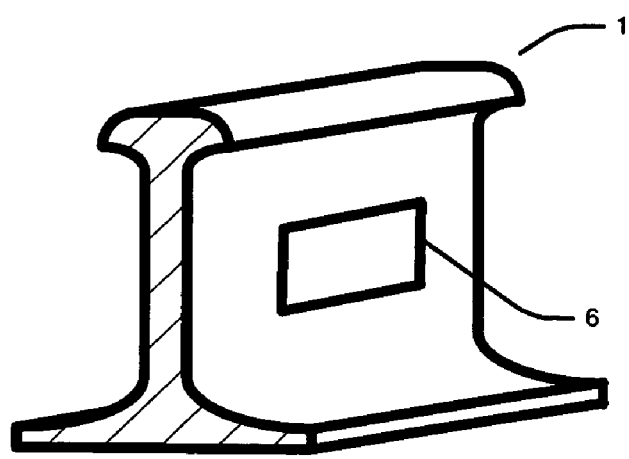

FIG. 2a and FIG. 2b show a cross sectional diagram of both sides of rail 1 in FIG. 1. As shown in FIG. 2a, which illustrates the outboard or outward side of the rail 1, various components 5 of the field sensor system 4 may be mounted along the web of the rail 1. FIG. 2b illustrates the inboard or inward side of the rail 1 where various components 6 of the field sensor system 4 are mounted along the web of the inner portion of the rail 1. Depending on the specific information or characteristics to be determined about the rail 1, the field sensor system 4 may include components 5, or components 6, or both. The components 5 or 6 may be housed in an enclosure that is mounted along the web of the rail 1.

In other embodiments, additional components of the field sensor system 4 may additionally be mounted along one or both sides of the opposing rail 2. Further, depending on the information required from the rails 1 and 2, it may also be appropriate to alternatively or additionally place components at other locations along the rail (other than along the web).

Figure 3:
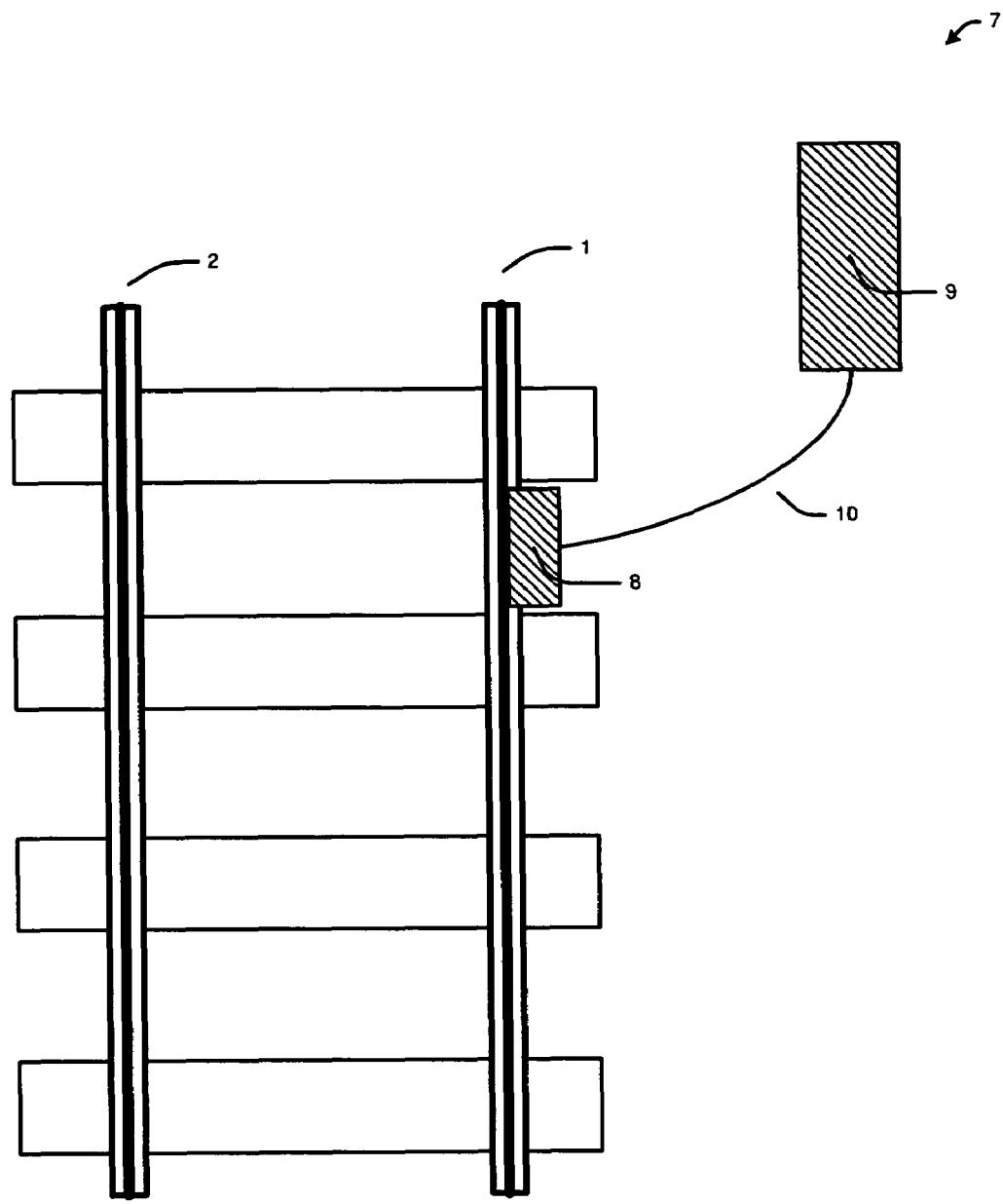
FIG. 3 is a diagram of a portion of a railway and an alternate field sensor system.

FIG. 3 shows an alternate configuration. In some situations, it may be preferable for some of the field sensor system components to be mounted a distance away from the rails 1 and 2, for a variety of reasons, including convenience, reliability, and to ensure that there is sufficient room for all of the components of the field sensor system. In FIG. 3, the field sensor system 7 is represented by boxes 8 and 9. Some of the components of the field sensor system are represented by box 8, which is located on or near the rail 1, and others are represented by box 9, which is located a distance away from the rail 1 (e.g., 30 feet). Often, components of the field sensor system 7 represented by boxes 8 and 9 are able to communicate over communications connection 10, which may be a wireless or wireline (cabled) connection.

Figure 4:
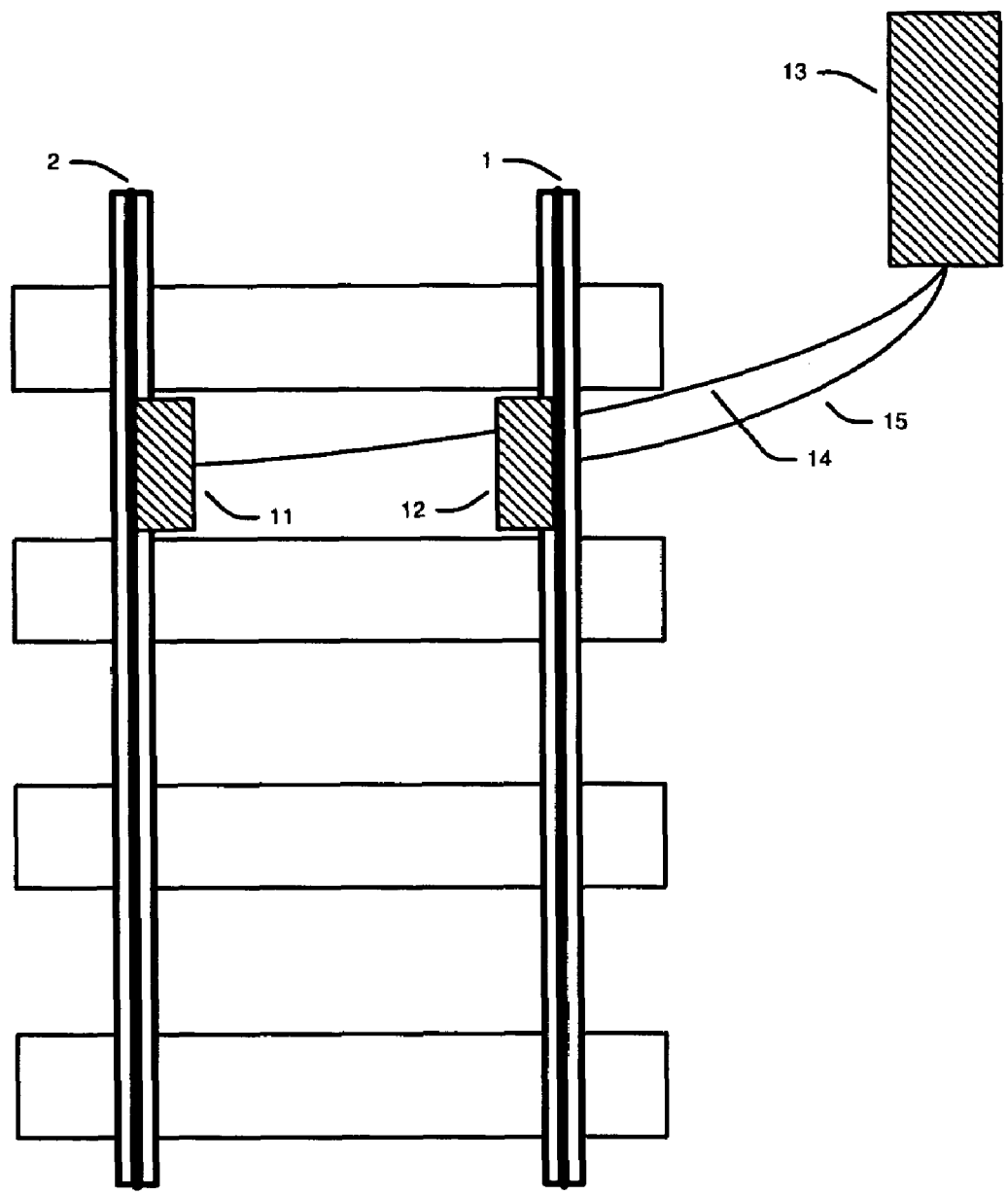
FIG. 4 is a diagram of a portion of a railway and an another alternate field sensor system.

In another embodiment, shown in FIG. 4, the field sensor system is represented by boxes 11, 12, and 13. In this embodiment, some of the components are located along the rails (see 11 and 12), and some components are located a distance away from the track, as represented by box 13. Normally, various components of the field sensor system in an embodiment such as that shown in FIG. 4 are connected in some fashion (see connections 14 and 15).

Figure 5:
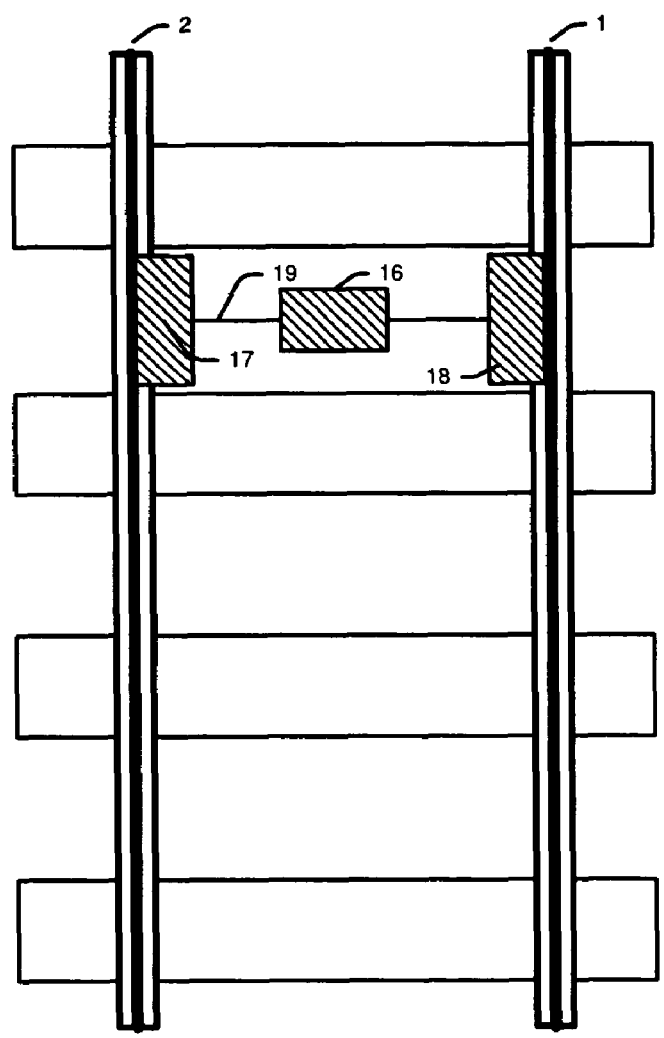
FIG. 5 is a diagram of a portion of a railway and a crib-based field sensor system.

FIG. 5 shows yet another configuration of the field sensor system, in which some of the field sensor components are located in a crib 16 between the rails 1 and 2. The field sensor system comprises, in this embodiment, the crib 16, and components at the rails 1 and 2, as represented by the boxes 17 and 18, all of which are connected by connection 19.

Figure 6:
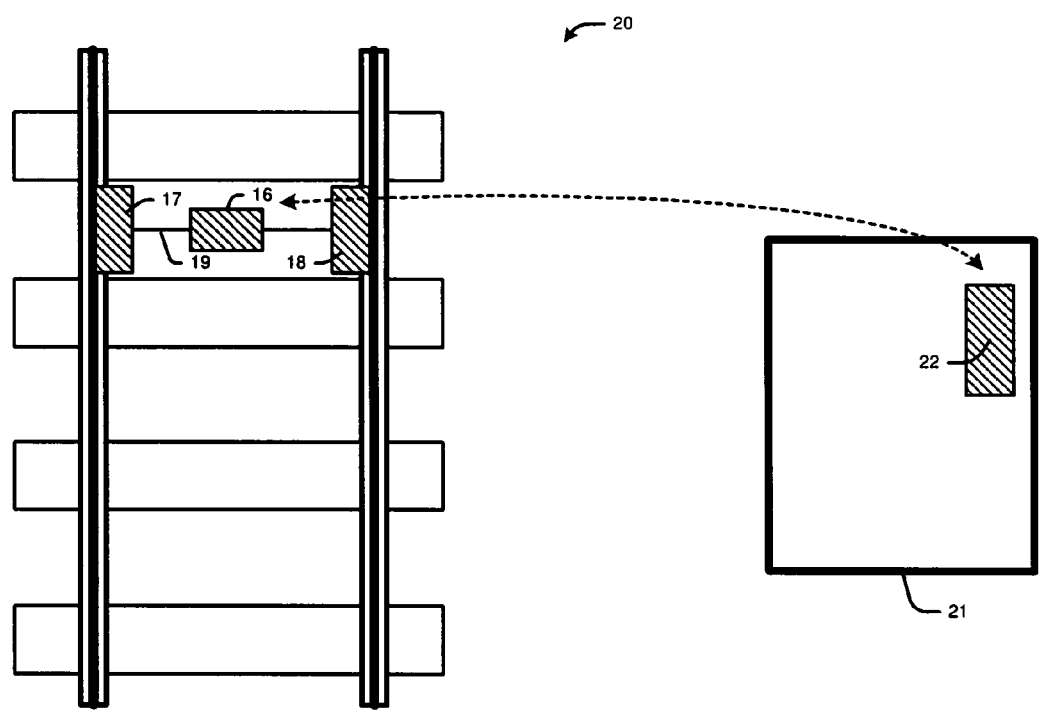
FIG. 6 is a diagram of a field sensor system where data collection is taking place.

In FIG. 6, the field sensor system 20 is made up of crib 16, components represented by boxes 17 and 18 (mounted along the rails 1 and 2), and connection 19. Data is collected from the rails 1 and 2 periodically by the components 17 and 18, and the data is stored in a storage area located in crib 16. In the embodiment of FIG. 6, the data stored in structure 16 is collected by data collection personnel. Data collection personnel travel (often using a vehicle 21) to the portion of the track where the field sensor system 20 is located, and use a data collection device 22 to collect the data from the field sensor system 20. Collection of the data takes place by interfacing the data collection device 22 to the field sensor system 20. This interface may be created in a variety of ways, such as through a physical RS-232 connection between the field sensor system 20 (or crib 16) and the data collection device 22, through a USB connection, or through any other means now known or hereafter developed for physically connecting two devices for the purpose of data communication.

In another embodiment, however, the data collection device 22 is able to interface with the field sensor system 20 over a wireless interface, such as Bluetooth, WiFi, or any other popular, proprietary, or otherwise appropriate method now known or hereafter developed. In such an embodiment, the data collection device 22 could query the field sensor system 20 for the data it has collected, and some or all of the data can then be transferred to the data collection device 22. In some situations, a wireless interface allows the person collecting the data to avoid leaving his or her vehicle 21 to collect the data. Some of the possible wireless technologies currently available are described in Shier, "Wireless Options for the Pocket PC: A Tutorial," *Pocket PC Magazine*, September 2003, p. 79, which is hereby incorporated by reference.

Figure 7:
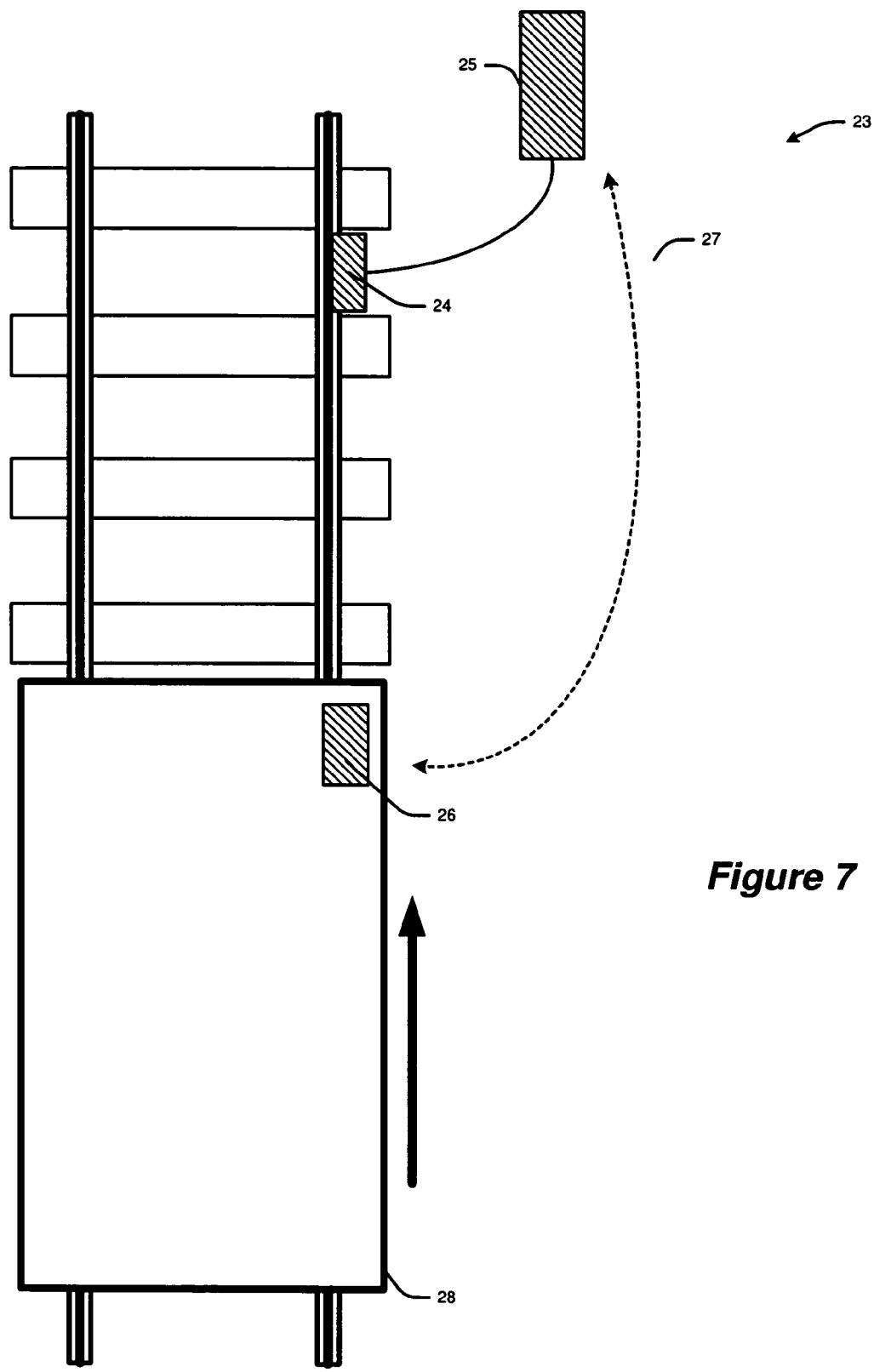
FIG. 7 is a diagram of a field sensor system where data collection is taking place in an alternate manner.

In FIG. 7, a field sensor system 23 is comprised of components 24 and 25, and it communicates with a data collection device 26 over a wireless interface 27 in a manner similar to that described in connection with FIG. 6. In the embodiment of FIG. 7, however, the data collection device 26 is located on a railway vehicle 28. The data stored in the field sensor system 23 is collected by the device 26 when the railway vehicle 28 comes close to the field sensor system 23, such as when it passes that portion of the track where the field sensor system 23 is located.

Normally, there are multiple field sensor systems located at various locations on the railway. Therefore, the data collection device 26 in the embodiment of FIG. 7 is preferably configured to allow collection of data from a variety of field sensor systems 23 located along the railway. Data is collected from each field sensor system as the railway vehicle 28 travels along the track. The railway vehicle 28 in FIG. 7 could be a railroad car or other vehicle that is adapted for use on the railway. Preferably, the railway vehicle 28 is a railroad car or other vehicle that regularly travels on the track for other purposes, so as to reduce the necessity of independent data collection personnel physically visiting each field sensor system solely to collect data from the field sensor system 23.

Figure 8:
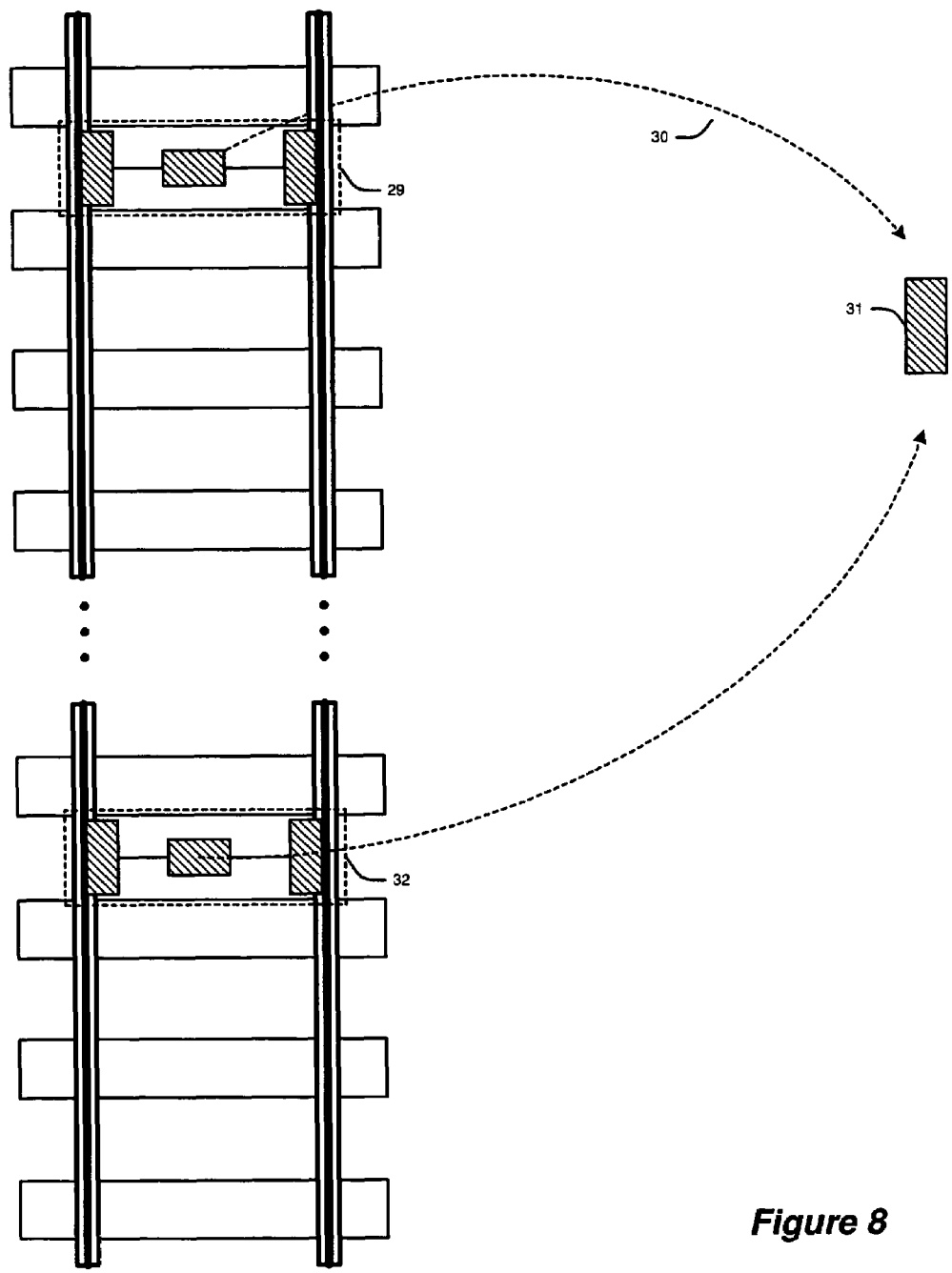
FIG. 8 is a diagram of a field sensor system where data collection is taking place in yet another manner.

In the embodiment of FIG. 8, a field sensor system 29 is configured in a crib configuration, such as in FIG. 6. (It should be understood that other configurations for the field sensor system 29 could be used, such as one or more of the configurations previously described.) The field sensor system 29 in the embodiment of FIG. 8 includes the capability to initiate communication over a wireless interface 30 to a data collection device 31. The field sensor system 29 in such an embodiment may initiate communication with the data collection device 31 periodically, and each time transfer the data it has collected to the data collection device 31. Alternatively, the field sensor system 29 may initiate communication with the data collection device 31 only when one or more of a particular set of conditions arise, such as conditions that suggest a degradation of the structural integrity of the rail being monitoried.

The ability for such communication initiated by the field sensor system 29 can be implemented by including within the field sensor system 29 cell or mobile telephony capability, satellite capability, WiFi, or any other known or hereafter developed technique for wireless communication. The data collection device 31 in such an embodiment may be at a distant location, and may also be in a location that allows more than one field sensor system to communicate with it, so that, for example, the data collection device 31 can receive data from field sensor systems 29 and 32, which monitor different portions of track. See FIG. 8.

Figure 9:
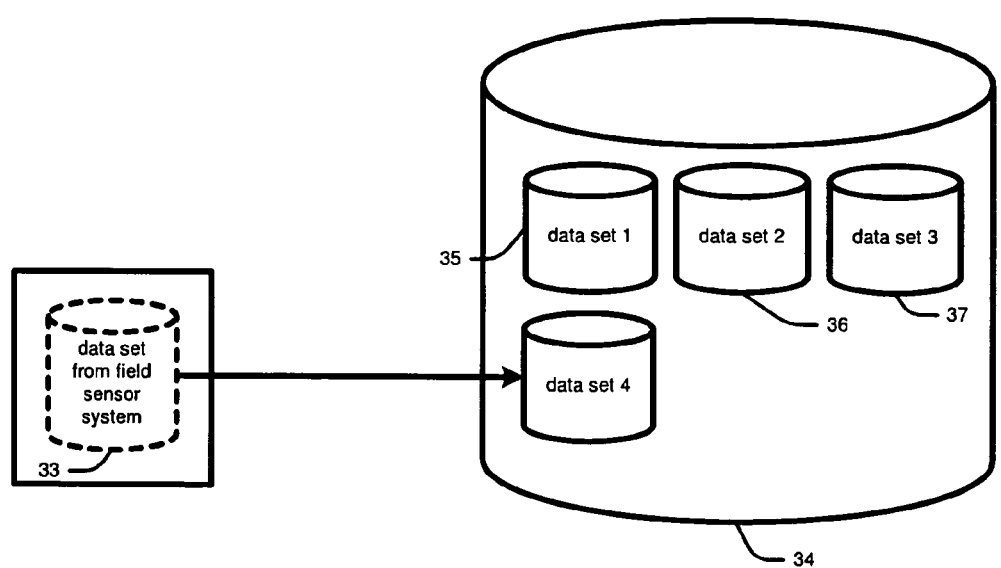
FIG. 9 is a diagram of data being stored in a database.

Once data is collected by a data collection device, the data may then be integrated into a master database that includes data relating to the structure being monitored (e.g., a railway rail) from prior data collection efforts. In FIG. 8, data from field sensor system 29 in one reading is collected by data collection device 31, and is represented by the data set 33 shown in FIG. 9. As shown in the embodiment of FIG. 9, the data set 33 from such a collection effort is integrated into a master database 34 along with data sets 35, 36, and 37 from prior collection efforts. The data in the database 34 can then be processed and/or analyzed to determine various characteristics and information about the condition of the structure(s) being monitored. The data in database 34 can be studied and analyzed to identify any situations where the integrity of the structure(s) being monitored has or is being degraded. In some situations, data from a history of collection efforts can be studied to determine patterns or trends in how the structure being monitored changes over time, or in response to various weather conditions, stresses, or other conditions.

Figure 10:
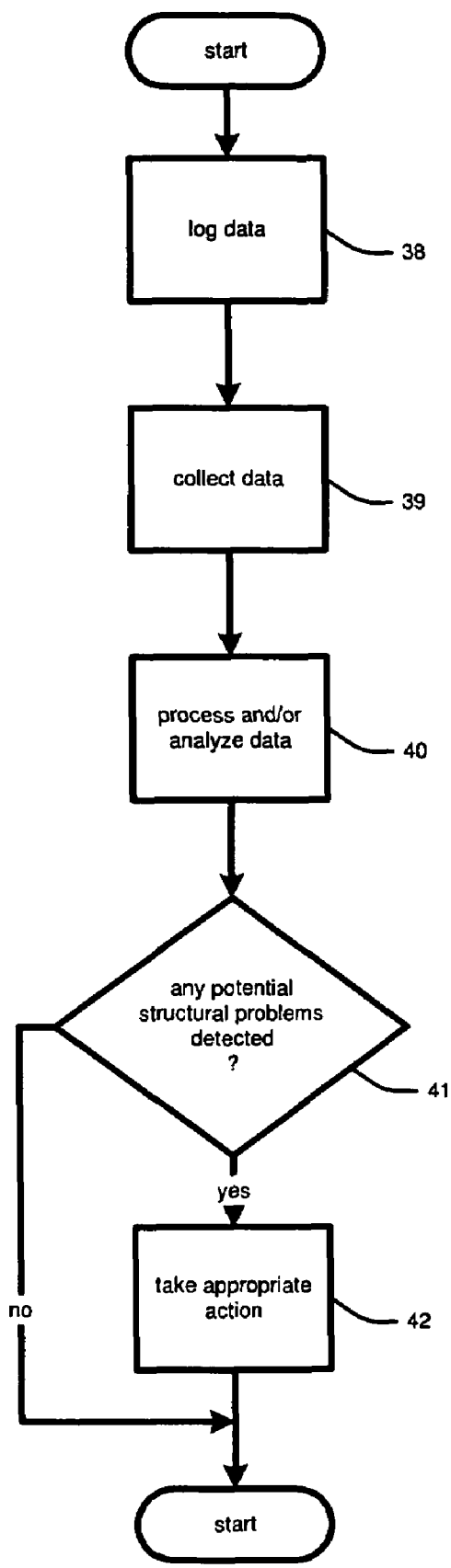
FIG. 10 is a flow chart illustrating the operation of data logging, collection, and analysis in some embodiments of the present invention.

FIG. 10 is a flow chart summarizing a typical process for data logging, collection, and analysis in an attempt to monitor and detect specific conditions that indicate a structure, such as a railway rail, may degrade to a point where it is no longer safe. Once the data is logged 38 and collected 39 in the manner previously described, the data can then be processed and analyzed 40, perhaps by comparing data from different data collection efforts, or by evaluating data to detect specific structural integrity issues. If any potential structural problems are detected 41, appropriate actions can be taken 42 to avert any safety hazards, and to repair or replace the affected structure. This process can be repeated indefinitely.

One particularly difficult structural problem associated with railway rail is its tendency to expand and contract over time. Specifically, railway rail is subject to expansion and contraction that is proportional to the temperature of the rail. When rail is heated, such as through weather changes or normal use, it expands, creating a compressive force. When rail is cooled, it contracts, thereby creating a tensile force.

At one time, railway track was constructed of relatively short individual track rails that were fastened together end-to-end using rail joints. Adjacent rails were typically spaced apart at each end with a small gap, which accommodated changes in the rail length. Presently, however, most railroads are constructed of continuously welded rail, so that the gaps between adjacent rails are virtually eliminated. With continuously welded rail, the rail's tendency to change length with changing temperatures is, in a sense, magnified, since there are no natural expansion or contraction joints to allow the rail to expand or contract.

The rail's tendency to change length represents a significant safety problem, because if the internal compressive forces on the rail become too great, the rail can buckle or kink (sun kinks). If the tensile forces become too great, the rail can crack and pull apart. Either condition jeopardizes the safety of normal train operations, and in some situations can lead to catastrophic train derailments. Unfortunately, it is often not visually apparent whether a particular rail is under an axial load that is potentially unsafe, so a safety hazard caused by a kinked rail, for example, may arise without much warning.

One way to address structural problems relating to the expansion and contraction of railway rail is to monitor the neutral temperature of the rail, which is defined as the temperature at which the rail is neither in tension or compression. When a rail is at its neutral temperature, it has no tendency to change length and has no internal axial force or stress. At temperatures which are cooler than the rail's neutral temperature, the rail is stretched and has an internal tensile force. And at temperatures warmer than the neutral temperature, the rail is squeezed and has an internal compressive force.

When new rail is laid by the railroads, it is installed at a safe neutral temperature predetermined by the railroad (90° F., for example). Yet it has been discovered that during normal railroad operation, the neutral temperature does not stay the same over time, but rather, can drift higher or lower. This neutral temperature drift can be caused by track maintenance, changes in the track sub-structure, normal train operations, or other conditions. It is not uncommon for a railroad to discover that the neutral temperature of a section of track has drifted down to 60° F. or even 50° F. If the neutral temperature of the rail is 60° F., then the rail is under a compressive force at any time weather or other conditions raises the actual temperature of the rail above 60° F. And in some situations, if the temperature of the rail exceeds the neutral temperature by more than approximately 50° F., the compressive force can be great enough to cause the rail to buckle or kink.

By monitoring the neutral temperature of the rail, it is therefore possible to identify rails that are susceptible to failure (cracking or kinking) due to excessive internal compressive or tensile forces. And through consistent monitoring of the neutral temperature of a rail, the railroads can be given an early warning about potentially hazardous rail conditions, and appropriate corrective actions or repairs can be undertaken before unsafe conditions result.

Figure 11:
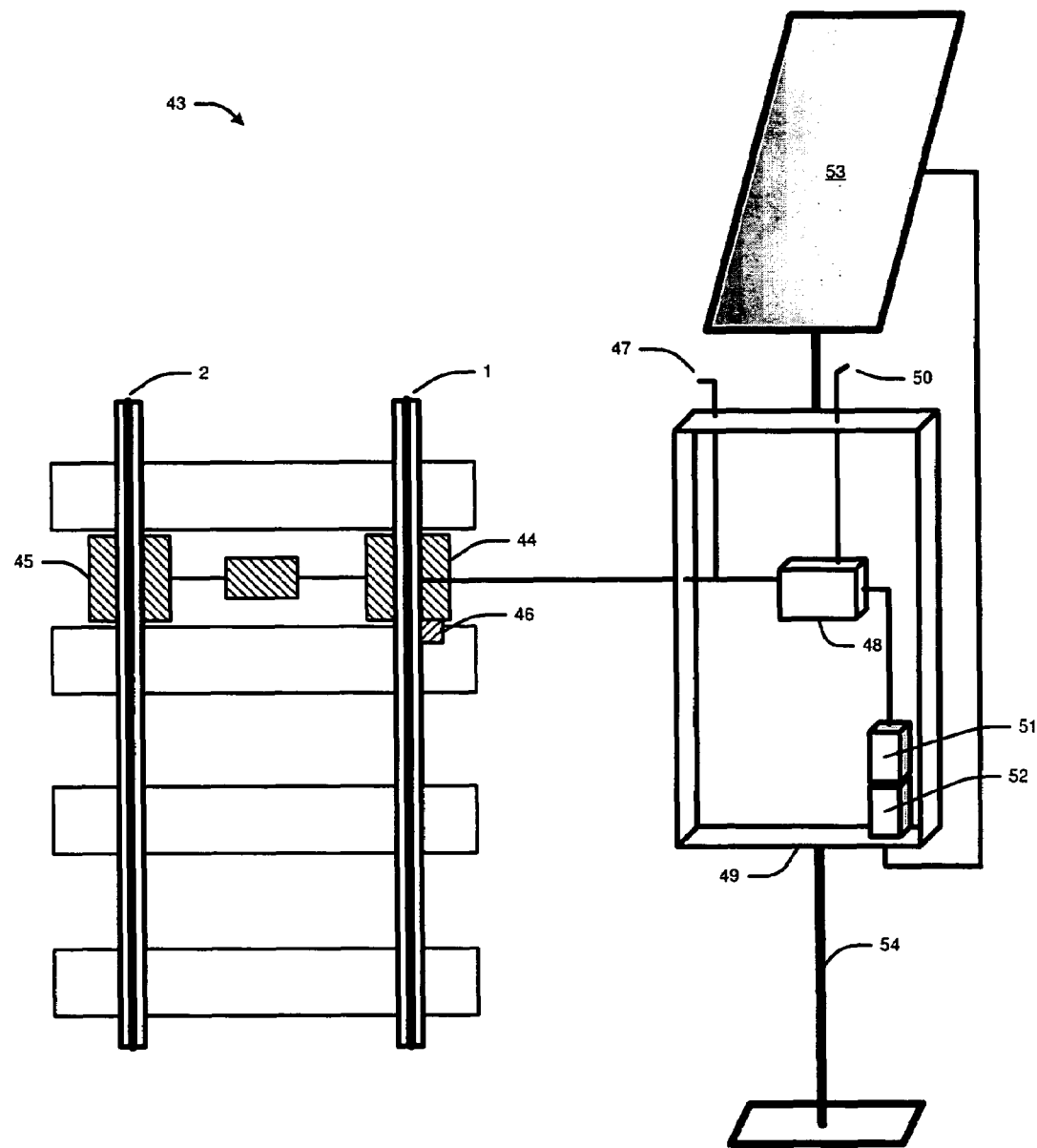
FIG. 11 is a diagram of a field sensor system that can be used to monitor neutral temperature.

FIG. 11 shows a diagram of a field sensor system 43 that can be used to monitor the neutral temperature of rails 1 and 2. The field sensor system 43 includes commercially-available strain gauge circuits, mounted on both sides of each rail at the locations designated by boxes 44 and 45. Two commercially-available thermocouple sensor circuits 46 and 47 are also used, one thermocouple 46 mounted to the rail 1, and the other thermocouple 47 mounted in a location that permits the collection of ambient temperature data. The output of the components 44, 45, 46, and 47 are connected to a module 48 in an enclosure 49. The enclosure 49 houses various components of the field sensor system 43, including the module 48, an antenna 50 that is used for communicating with a data collection device (not shown), rechargeable batteries 51, and a charge controller 52.

Rechargeable batteries 51, such as 12 V DC batteries, power the entire field sensor system 43. The batteries are recharged using a charge controller 52 and a solar panel 53, which is mounted on a pole 54. In some embodiments, it is convenient to mount the enclosure 49 on the solar panel pole 54.

Figure 12A:
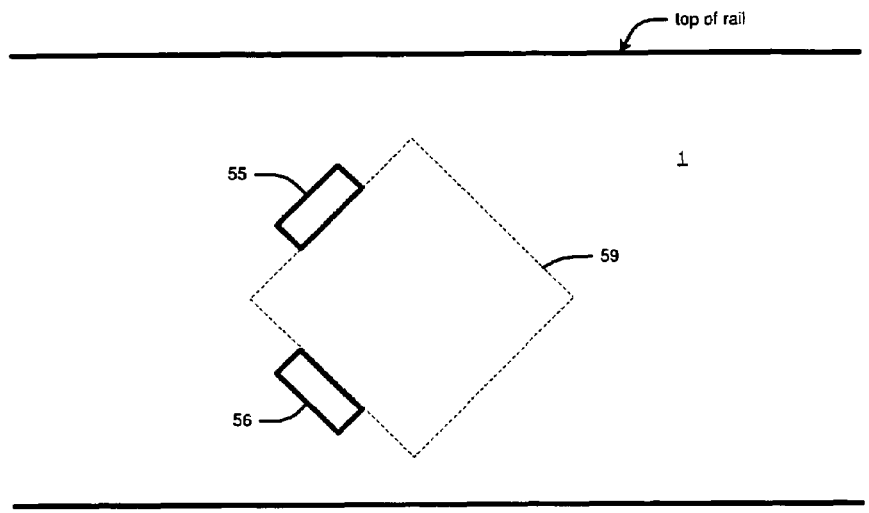
FIGS. 12a and 12b show the configuration of strain gauge circuits on a rail.
Figure 12B:
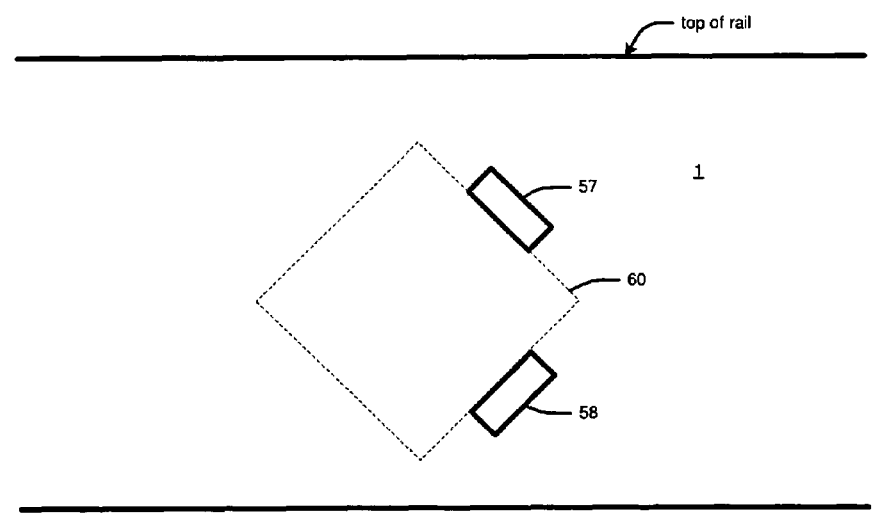

FIGS. 12(*a*) and 12(*b*) show in more detail the configuration of the strain gauge circuit 44 on rail 1. Normally, strain gauge circuits are implemented by resistors that change resistance as they are stretched or compressed. When mounted in the web of the rail, such as is shown in FIGS. 2(*a*) and 2(*b*) and FIGS. 12(*a*) and 12(*b*), they can be used to determine to what extent the rail has been stretched or compressed in the longitudinal direction.

In the embodiment shown in FIG. 12, four separate strain gages 55, 56, 57, and 58, mounted along the web of the rail 1, are used to measure the force in the rail. FIG. 12(*a*) shows the strain gauges 55 and 56 mounted in the web on the outboard side of the rail 1. The gauges are preferably mounted in a Wheatstone bridge configuration, along the side of an imaginary diamond 59 drawn on the web of the rail 1 as shown in FIG. 12(*a*). The gauges 57 and 58 are preferably mounted on the opposite side of the rail (inboard) along a corresponding diamond 60 as shown in FIG. 12(*b*).

Figure 13:
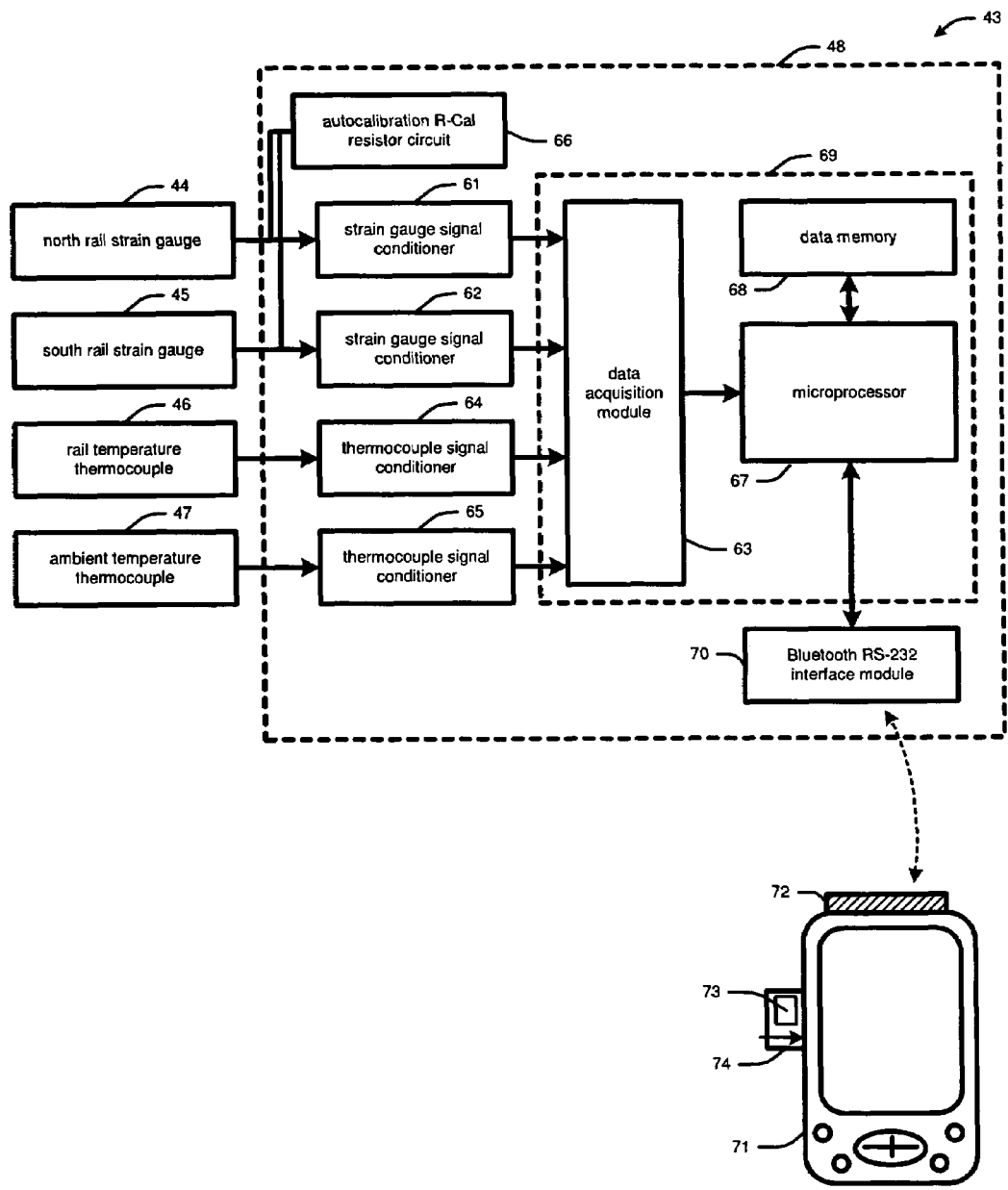
FIG. 13 is a block diagram of a field sensor system.

FIG. 13 is a block diagram of components of the field sensor system 43 shown in FIG. 11 and FIGS. 12(*a*) and 12(*b*). The voltages from the north and south strain gauges 44 and 45 are each fed into a bridge amplification circuit or signal conditioner 61 and 62 to condition the signal before the data acquisition device 63 can read the voltages. The bridge amplification circuits 61 and 62 amplify the voltages that come from the strain gauge circuits 44 and 45. The bridge amplifiers 61 and 62 also provide current for the strain gage circuits 44 and 45. The strain gauges are preferably calibrated when installed, and such calibration may require the current neutral temperature of the rail, which then is used to determine an offset voltage ($V_o$) that is used in calculating neutral temperature. Calibration may not be necessary for some embodiments, such as for monitoring fluctuations in the neutral temperature.

If calibration is required, any appropriate method now known or hereafter developed for placing a rail at a known neutral temperature or measuring the neutral temperature of an existing rail can be used for calibration. Normally, the rail is simply placed at a known neutral temperature by cutting and re-welding it so that it is not in compression or tension. The current rail temperature is then the neutral temperature of the rail that can be used for calibration. If necessary, there are also ways to measure the neutral temperature of an existing rail, however. For example, one method involves cutting the rail to determine the distance it expands or contracts, and then from this information, calculating its initial neutral temperature. In another method, a portion of existing rail is unclipped from its ties, and the rail is raised several inches. A Verse is used to determine the amount of force is required to raise the rail a certain distance. From this information, the neutral temperature can be determined.

The signals from thermocouples 46 and 47 are fed into thermocouple signal conditioners 64 and 65 that amplify the thermocouple voltages so they can be read by the data acquisition device 63. The signal conditioners 64 and 65 also will preferably contain a cold junction compensator that adjusts for the cold junction created when connecting the thermocouple wire to the signal conditioner. In general, no calibration is necessary for the thermocouple signal conditioners.

In some embodiments, to provide some assurance that data quality is high, an auto calibration R-Cal resistor circuit 66 is used. As is known by those skilled in the art, the R-Cal resistor is used to ensure that the resistance measured by the strain gauges shown in FIGS. 12(*a*) and 12(*b*) is consistent with calibration. The R-Cal resistor can be installed so that it can temporarily replace the resistance provided by the strain gauges (e.g., 55 and 56). By reading the resistance provided by the R-Cal resistor (a known quantity) it can be determined whether the resistance provided by the strain gauges (e.g., 55 and 56) is accurate. This measurement may be taken periodically (e.g., each strain gauge reading or perhaps once per day) or on demand to ensure data quality.

A microprocessor 67 and memory 68 are used for storing data from the data acquisition module 63. The data acquisition module 63, the microprocessor 67, and the data memory 68 may, in some embodiments, be implemented using a commercially-available data logger device 69, such as an Adam-5510 manufactured by Advantech of Cincinnati, Ohio. In other embodiments, the data logger device 69 could be integrated as one or more components, perhaps on a single circuit board.

Also shown in FIG. 13, a Bluetooth wireless interface module 70 is controlled by the microprocessor 67 to communicate with a PDA or Pocket PC or other portable device 71, which has a Bluetooth communications module 72 and is executing an application program 73. An insertable storage card 74, such as a Secure Digital card, may also be used as storage for the application program 73.

In some embodiments, the components used to construct the field sensor system 43 are chosen or designed so that they facilitate replacement or repair of the system 43. For example, the module 48 might be designed so that it can be easily replaced in the event that one or more components of the module 48 fails. In such an embodiment, a field sensor system having a faulty module 48 may be remedied by disconnecting the sensors, power, and antenna cables from the faulty module 48, and replacing it with a substitute module having the same or similar connections, so that the same sensors, power, and antenna cables can be easily reattached. The faulty module 48 may then be sent to an appropriate location for diagnostic testing, if desired.

By designing the system 43 to allow for these types of "modularized" replacements of the module 48 (or other components in a similar fashion), repairs can be completed more efficiently. In some situations, a technician with little familiarity with the system 43 can effectively repair it by replacing one or more of the modular components that are part of the system 43.

Using the strain gauges 44 and 45 and the thermocouples 46 and 47, the neutral temperature of each rail can be calculated from the rail temperature and the internal force in the rail. Specifically, $$NT = T - P/(Area \times E \times a)$$

Where:
NT is the neutral temperature of the rail,
T is the actual temperature of the rail,
P is the internal longitudinal force in the rail,
Area is the area of the rail cross-section,
E is the Modulus of Elasticity for the track system,
a is the Coefficient of Thermal Expansion for steel.

The temperature of the rail, T, is calculated from the thermocouple devices mounted on the rails as follows:

$$T = (V \times A) \times B$$

Where:
T is the temperature of the rail (Fahrenheit),
V is the voltage from the signal conditioners,
A is the temperature conversion scale constant,
B is the temperature conversion offset constant.

And the force in the rail, P, is calculated using the strain gauge circuits mounted on the rails, as follows:

$$P=(V_s+V_o) \times C$$

Where:

P is the force (lbs.)

$V_s$ is the strain gauge voltage, $V_o$ is the voltage offset in volts (from calibration), C is the voltage to force conversion constant.

Background and additional information relating to the foregoing calculations can be found in Beer & Johnston, *Mechanics of Materials* (McGraw Hill 1981), Cook & Young, *Advanced Mechanics of Materials* (MacMillan 1985), and Omega Engineering, Inc., *The Temperature Handbook* (Omega 1999). Each of these references is hereby incorporated by reference.

Referring to FIGS. 11 and 13, the sensors 44, 45, 46, and 47 are sampled periodically at a defined interval, such as once each hour, although this time period can be configured as desired. The data acquisition device 63 converts the analog voltages to digital voltages for each of the four sensor readings. Software in the microprocessor 67 stores these voltages in the memory 68 along with a time stamp of when they were collected. The sensor readings are stored in the field sensor's memory 68 until they can be downloaded to a data collection device 71. Each time a sample or reading is taken (e.g., each hour), a reading counter maintained in the memory 68 is incremented so that the number of samples that are stored in the memory 68 can be ascertained.

Data is collected from the memory 68 using a handheld device, such as a Pocket PC device 71 with wireless communication capability. The Pocket PC device 71 executes a data collection application (represented by 73 in FIG. 13) that enables wireless communication with the field sensor system 43. In the embodiment of FIG. 13, data is transmitted to Pocket PC 71 over a wireless signal using the Bluetooth wireless communications protocol. The module 48 includes a Bluetooth RS-232 module 70 that is attached to the RS-232 port of the microprocessor 67, and the Pocket PC 71 includes a Bluetooth radio module 72. The RS-232 module 70 and the module 72 in the Pocket PC allow wireless communication as if an RS-232 cable linked the Pocket PC 71 and the microprocessor 67.

In the embodiment of FIG. 13, when the data collection application 73 is executing on a Pocket PC 71, and a user brings the Pocket PC 71 within the range (approximately 10 meters) of the Bluetooth RS-232 Module 70, the Pocket PC 71 automatically connects to the field sensor system 43 (module 70) and establishes a connection. In some embodiments, the system parameters for the field sensor system 43 as well as all of the data that has been collected in memory 68 since the last download are automatically downloaded to the Pocket PC 71 upon establishing an initial communications link. This data is stored in available storage in the Pocket PC 71.

In some embodiments, it is useful to store the system parameters for the field sensor system 43 in the memory 68. Storing system parameters for the field sensor system 43 in the memory 68, and making such system parameters available to be downloaded by any Pocket PC 71 device that may be used for collection of data ensures that data collection personnel can use any Pocket PC running the data collection application 73 to download the data. In other words, multiple Pocket PCs can be used interchangeably in some embodiments to collect data from various field sensor systems.

The system parameters stored in the field sensor system 43 may include: (1) the system date and time as maintained by the field sensor system, (2) field sensor system name, (3) field sensor system identifier (e.g., a number or code), (4) number of records of normal data collected, (5) number of records of archive data collected, (6) strain gauge voltage offsets for each rail, (7) initial neutral temperature for each rail (when the rail was installed or most recent calibration), and (8) rate at which data is sampled.

Once the system parameters and the data collected since the last download have been retrieved by the Pocket PC device 71, the memory 68 may also then be cleared. The Pocket PC 71 can also specify specific data to be retrieved from or written to the field sensor system 43 by sending ASCII commands to the microprocessor 67 over the Bluetooth connection.

Figure 14:
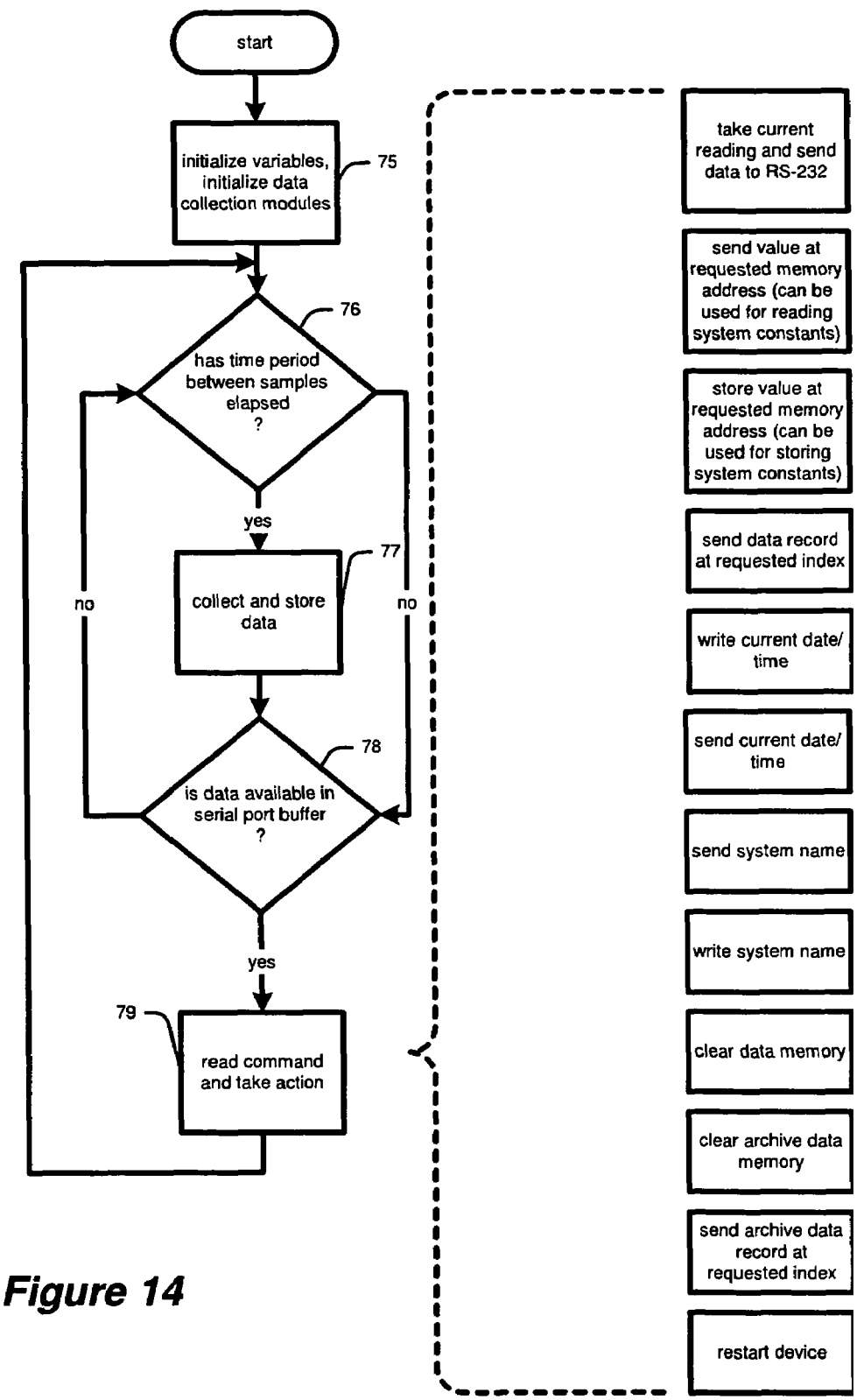
FIG. 14 is a flow chart of the operation of a device in a field sensor system.

FIG. 14 is a flow chart of the operation of data logger device 69 in the embodiment of FIG. 11 and FIG. 13. When the field sensor system 43 is installed, memory and various variables (such as a sample counter) are initialized 75, and the system enters a loop at 76. Once a sufficient amount of time has elapsed, the data from the sensors is collected 77 through the data acquisition device 63 and stored in memory 68 for later collection. Also, the serial port buffer for the microprocessor 67 is continuously monitored 78 for data representing a command sent by a Pocket PC device 71. If such data is present at the serial port, appropriate action is taken in response to the command. The microprocessor is capable of performing a variety of actions, some of which involve reading from and writing to memory 67. See 79 in FIG. 14.

Figure 15:
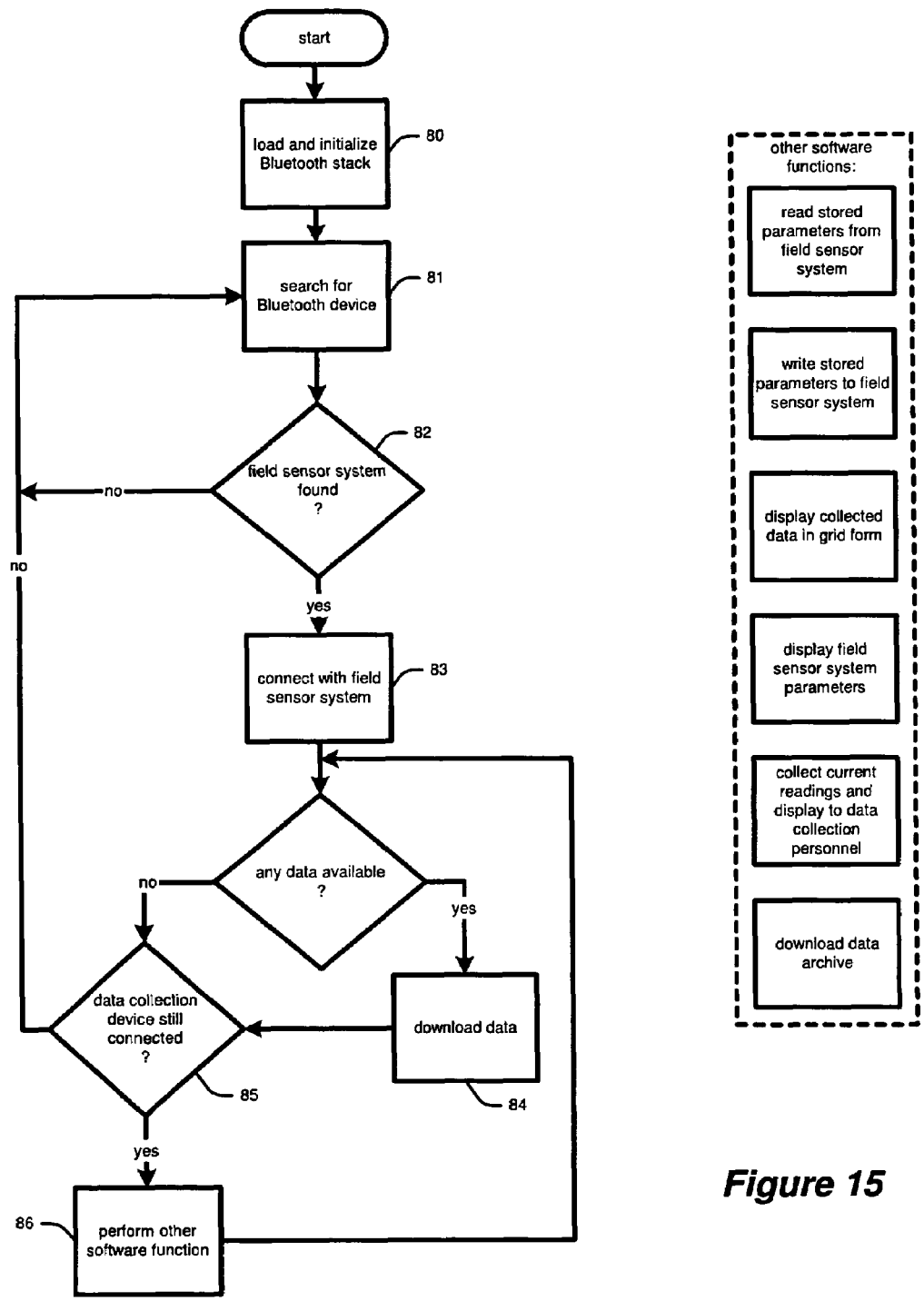
FIG. 15 is a flow chart of the operation of a data collection device.

FIG. 15 is a flow chart of the operation of the data collection application 73 running in the Pocket PC 71 used by data collection personnel in FIG. 13. At startup 80, the Bluetooth capability or other communications capability is loaded and initialized. When data collection personnel starts the data collection application 73, he or she has typically traveled to a location near a field sensor system 43, and the Pocket PC 71 enters a loop searching for another Bluetooth device in the area 81. Once a field sensor system has been detected 82, the Pocket PC 71 connects to it through the Bluetooth connection 83. Upon making this initial connection, the system parameters for the field sensor system 43 and any available data are downloaded 84 to the Pocket PC device.

While the Pocket PC device is still connected 85, a number of other software functions 86 can be performed. For example, once the data stored in the field sensor system memory 67 is downloaded, data collection personnel can view the recently retrieved data or data from previous collection efforts on the Pocket PC 71, and view and change any of the system parameters that are stored at the field sensor system 43.

Figure 16:
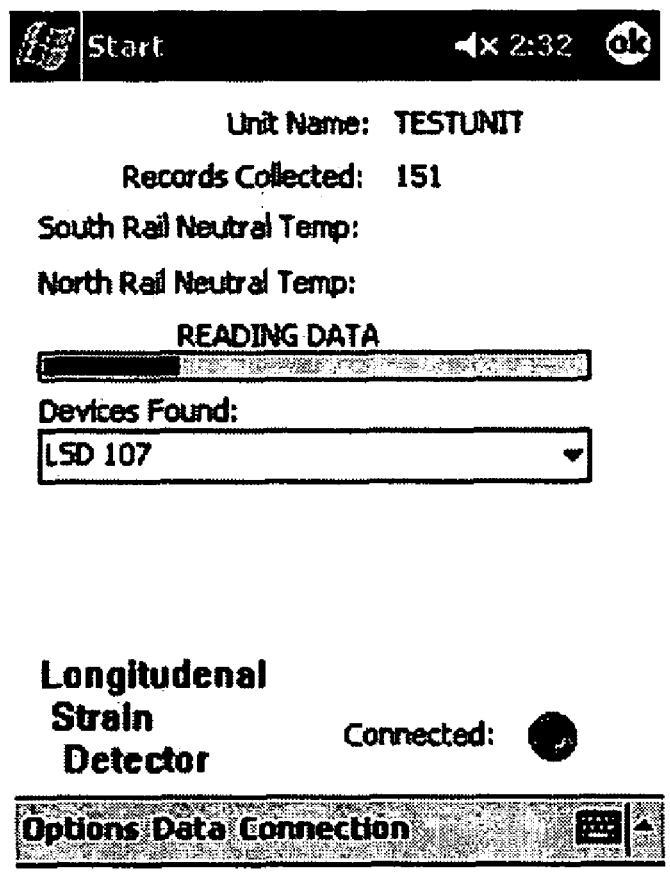
FIGS. 16, 17, 18, 19, and 20 are screen displays for a Pocket PC-based data collection device.
Figure 17:

FIG. 16 shows the display of a Pocket PC device 71 in an embodiment such as that illustrated in FIG. 15. In FIG. 16, the display is shown after the Pocket PC 71 has made an initial connection to a field sensor system having the name "LSD 107." FIG. 16 also shows that 151 data records are being read from the LSD 107 field sensor system. Once the data is read, the Pocket PC 71 calculates the neutral temperatures for both the north and south rails, preferably using the most recent data record, and this calculation is displayed, as shown in FIG. 17. (In some embodiments, it is possible that the neutral temperature calculation is performed by the data logger device 69, or by other logic.)

Figure 18:
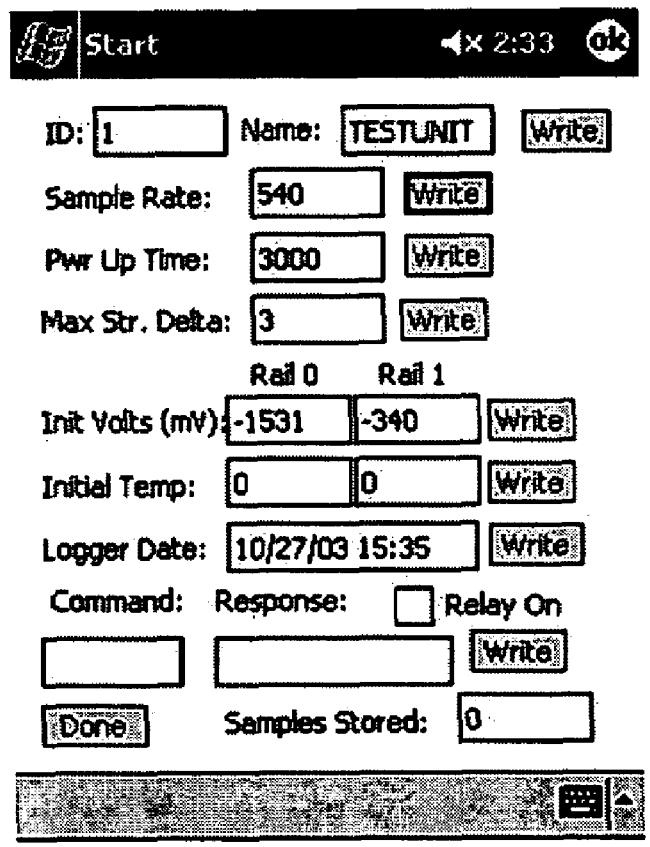

Selecting the "Options" menu at the bottom of the screen in FIG. 16 provides the ability to (1) exit the program, and (2) view the system parameters for the field sensor system. Selecting the option to display system parameters causes a screen such as that shown in FIG. 18 to appear. From this screen, it is possible to change the indicated parameters by changing the displayed item and then selecting the "write"

button to write the data to the field sensor system. The data is written by communicating with the microprocessor 67 over the wireless Bluetooth connection.

Figure 19:
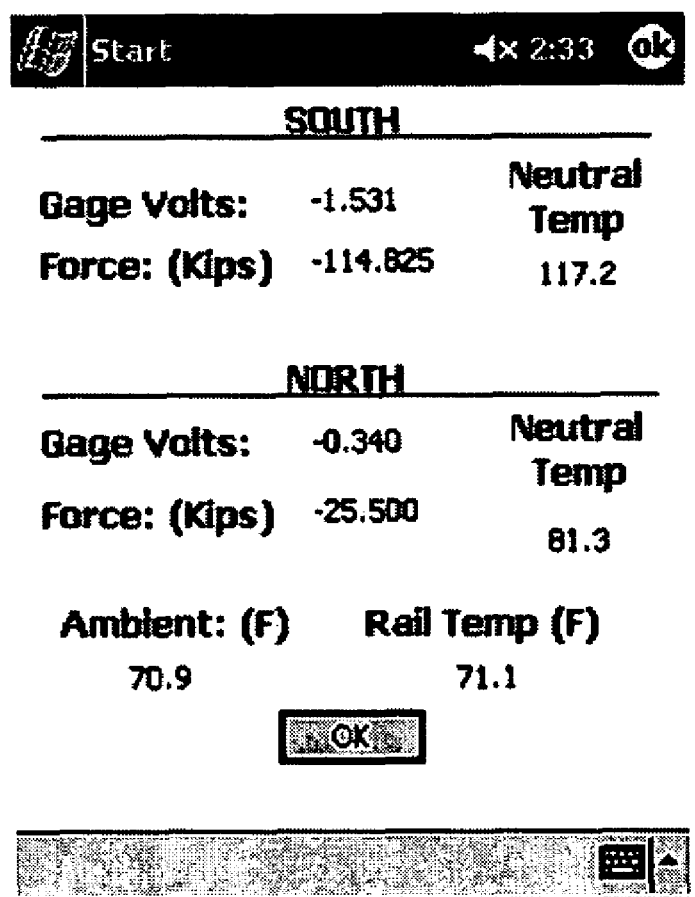

The "Data" menu item in FIGS. 16 and 17 provides the ability to display (1) the current neutral temperature calculation, or (2) historical data retrieved by the Pocket PC device 71. Selecting the first option causes a screen such as that shown in FIG. 19 to be displayed, which shows the neutral temperature calculation in FIG. 17, as well as some of the underlying data used to calculate the neutral temperature.

Figure 20:
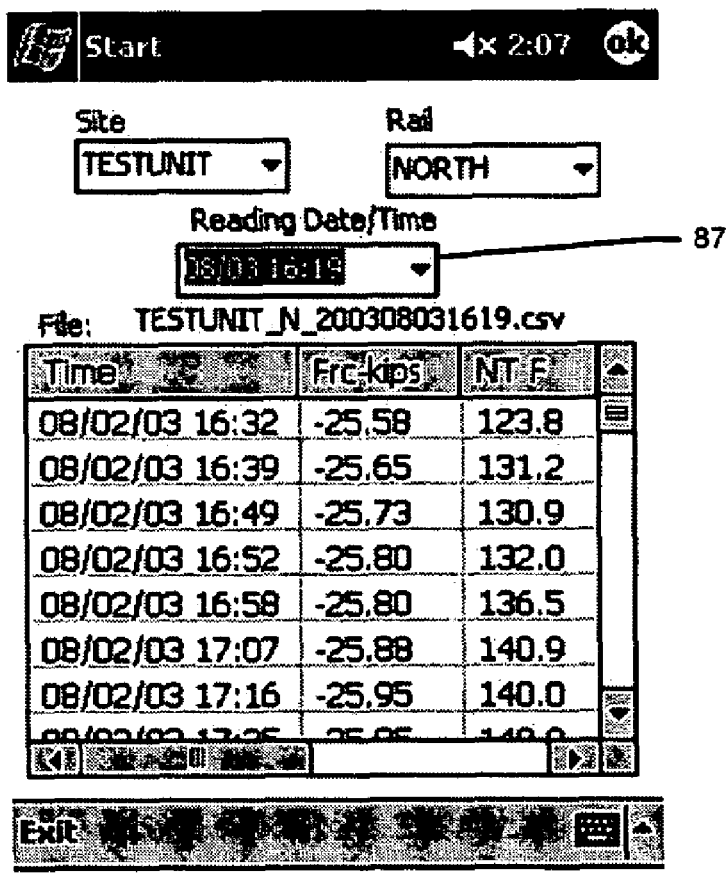

Selecting the second option causes a screen such as that shown in FIG. 20 to be displayed. The screen in FIG. 20 shows the raw data collected by the field sensor system, and the time each reading was taken. The reading date/time 87 shown in the center of the screen is the date the Pocket PC 71 downloaded the data from the field sensor system 43, and the time entries shown in the grid are the actual times the sensor measurements for the indicated site and rail were taken by the field sensor system 43. Data collection personnel can select other reading dates 87 stored on the Pocket PC 71 by selecting the desired date from the drop-down menu associated with 87 shown in FIG.

In some embodiments, the application running on the Pocket PC 71 is stored on a Secure Digital (or other) memory card 74 that can be inserted and read by the Pocket PC. This allows the software to be used on virtually any Bluetooth-enabled Pocket PC device by simply inserting the memory card 74, and in general, without any additional configuration or software installation.

Once new data is collected by the Pocket PC 71, the new data can be integrated into a master database where other readings are stored. In some embodiments, this is done by synchronizing the Pocket PC device using software such as Microsoft's ActiveSync to transfer the data on the Pocket PC to a desktop or other computer where a master database is maintained.

Figure 21:
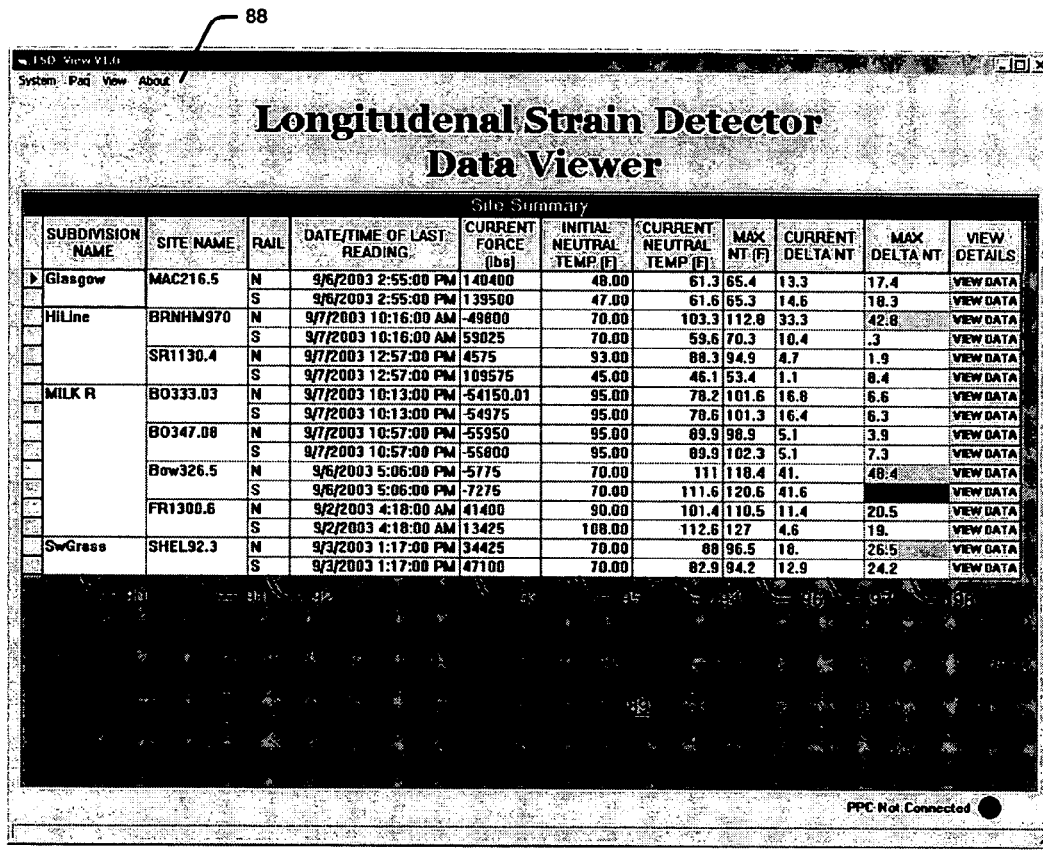
FIG. 21 is a screen display for a desktop data viewing and analysis application.

FIG. 21 shows a screen from a desktop application that can be used in an embodiment of the present invention to analyze the data collected from various field sensor systems. The application has a pull-down menu 88 and a data display area 89.

The data shown in the display area 89 in FIG. 21 relates to various readings from a number of field sensor systems deployed on a railroad. The subdivisions listed in the first column 90 identify a section of track, which may include one or more field sensor systems. The site name column 91 lists the identifier for each field sensor system located in the corresponding subdivision. Column 92 lists the date and time that a reading on each rail was last taken using a data collection device. The current force 93 and current neutral temperature 94 as calculated for the last data available for each site is also listed, along with the initial neutral temperature of the rail 95, which is determined when the rail was installed, or when the field sensor system was last or previously calibrated. The historical maximum neutral temperature is listed 96, along with the current difference (i.e., delta) 97 between the current neutral temperature 94 and the initial neutral temperature 95 are also shown for each of the two rails at each site. In addition, the difference between the maximum neutral temperature 96 and the initial neutral temperature 95 is also shown 98. Where certain data thresholds are met for some of the columns of data in FIG. 21, color or other visual indicia may be used to highlight data that may be of interest to the user, such as measurements that suggest a significant change in neutral temperature.

Figure 22:
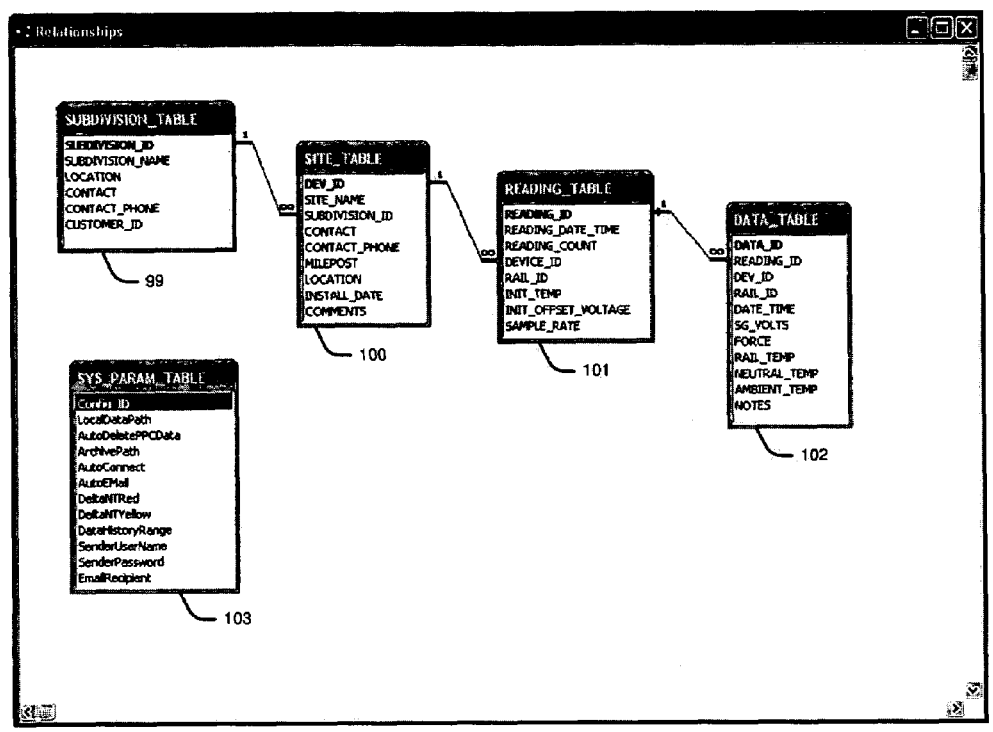
FIG. 22 is a diagram of a relational database.

The data shown in FIG. 21 is preferably taken from a relational database, such as the database represented by the diagram in FIG. 22. Shown in FIG. 21 are five tables 99, 100, 101, 102, and 103. Table 99 is used for storing a list of Subdivisions and characteristics associated with each Subdivision. Each Subdivision, which generally refers to a section of railway track, has a name, a location, and may have a contact person and phone number. Associated with each Subdivision may be one or more Sites, which are listed in the Sites table 100. For each Site, one or more Readings may be stored in the Readings table 101, and each Reading may have associated with it one or more data entries, which are stored in the Data table 102. A System Parameters table 103 is also shown in FIG. 22.

Figure 23:
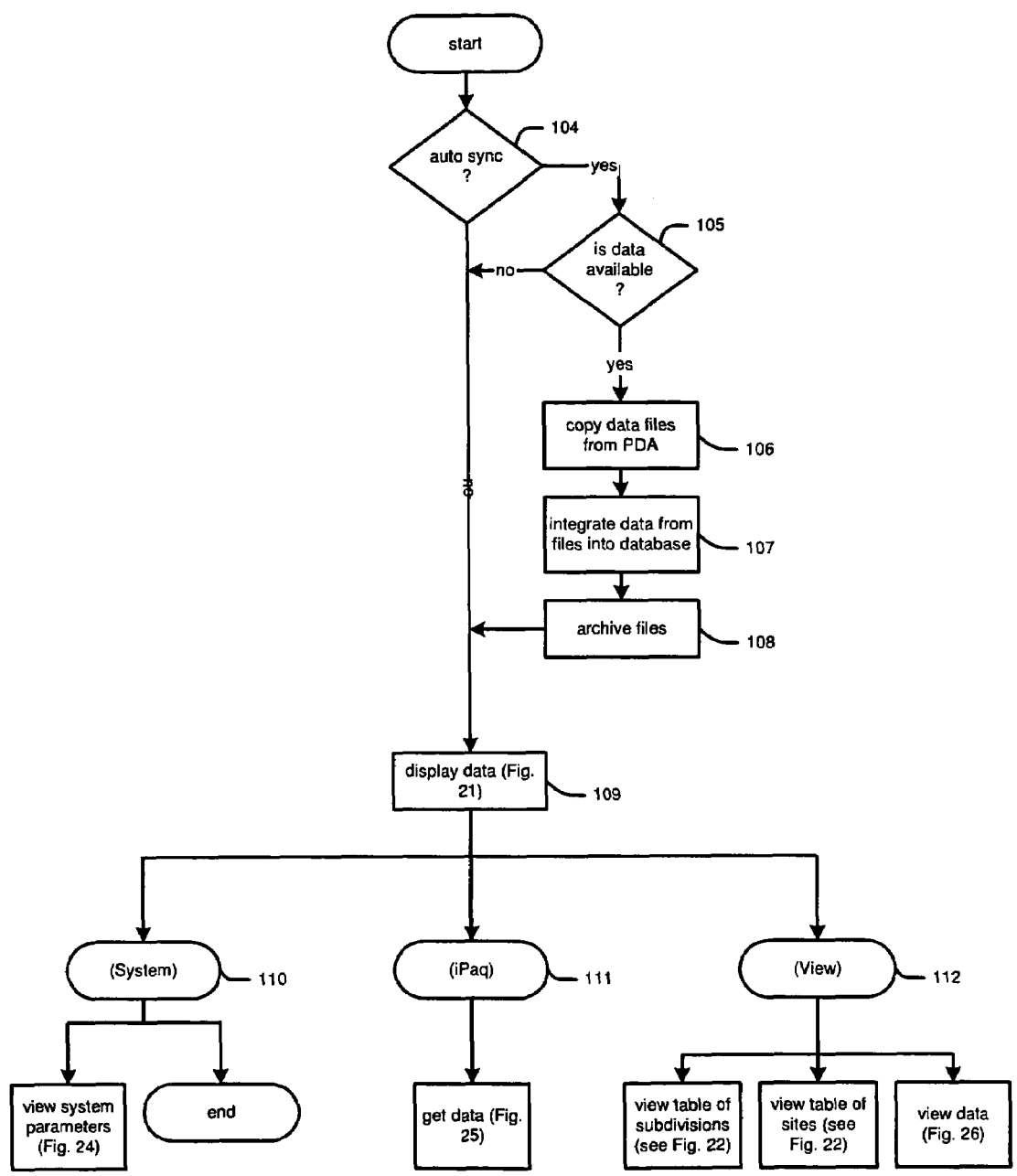
FIG. 23 is a flow chart of the operation of a data viewing and analysis application.

FIG. 23 is a flowchart of the operation of the desktop application of FIG. 21. When the application starts, and if the application is configured to automatically synchronize 104 any new readings from the Pocket PC, the Pocket PC is queried to determine whether any new data (typically in the form of data files or text files) is available 105. If any data is available, the data is copied from the Pocket PC to the desktop PC executing the desktop application 106. The data may then be integrated 107 into a database, such as the one illustrated in FIG. 22. The files may then be stored in an archival location on the PC or elsewhere 108, and the files may also be removed from the Pocket PC. During this process, the desktop PC user may receive visual or other confirmation as these steps are being completed.

When this auto sync process is completed (or if it is not enabled), the user is presented with a display such as that shown in FIG. 21 (see 109 in FIG. 23). The application window for the desktop application shown in FIG. 21 has a pull-down menu 88, which can be used to access a number of functions. The pull-down menu 88 includes a System menu 110, an iPaq menu 111, and a View menu 112, as represented in FIG. 23.

Figure 24:
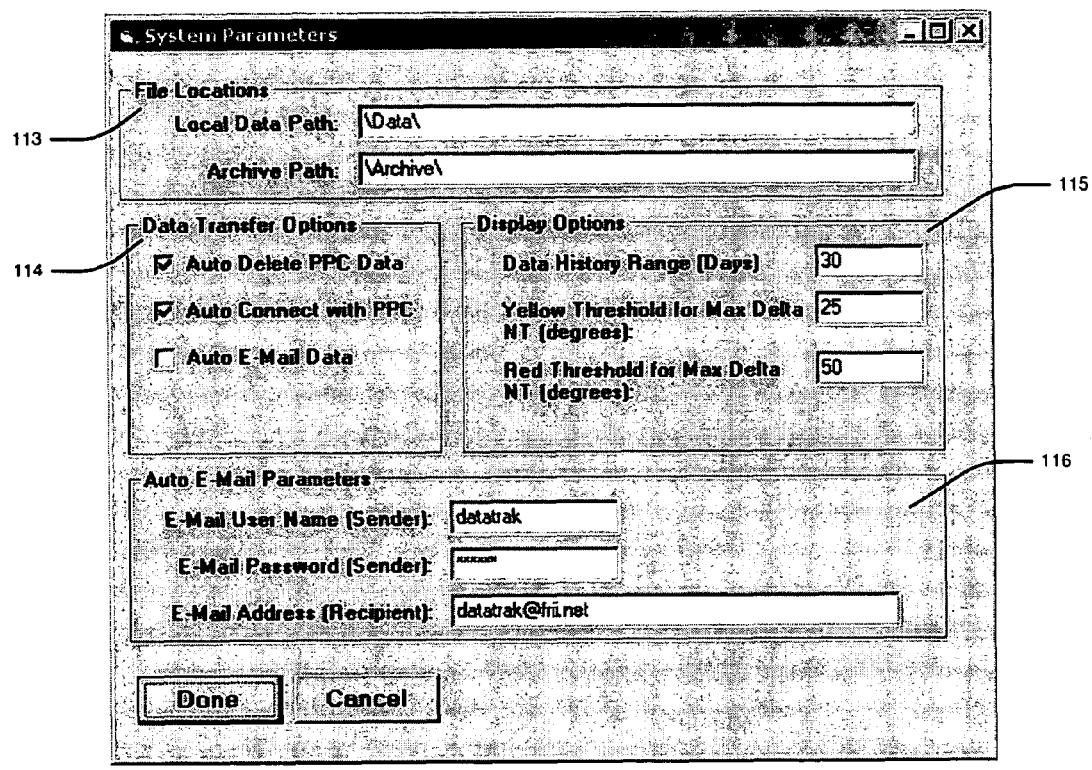
FIGS. 24, 25, and 26 are screen displays for a desktop data viewing and analysis application.

By selecting the System menu 110, the user may either view system parameters, which causes a dialog box such as that shown in FIG. 24 to appear, or the user may exit the program. The dialog box of FIG. 24 provides the opportunity to alter the way in which the desktop application of FIG. 23 operates. The user can modify the location where data files are stored or archived 113, and can modify the way data is transferred and otherwise handled 114. For example, the automatic synchronization feature (see 104 in FIG. 23) can be enabled in this dialog box, and data may be automatically deleted from the Pocket PC after transfer (see 106 in FIG. 23). In addition, the desktop application can be configured to send an email including some or all of the data to a desired email address. This can be carried out automatically, periodically, and/or when one or more of various conditions are met by the data. See 116 in FIG. 24. The dialog box of FIG. 24 also provides the ability to modify the data history range, or the number of days data is displayed in the display window of FIG. 26. Also, the color thresholds for the data displayed in FIG. 21 may also be configured in the dialog box of FIG. 24. See 115 of FIG. 24.

Figure 25:
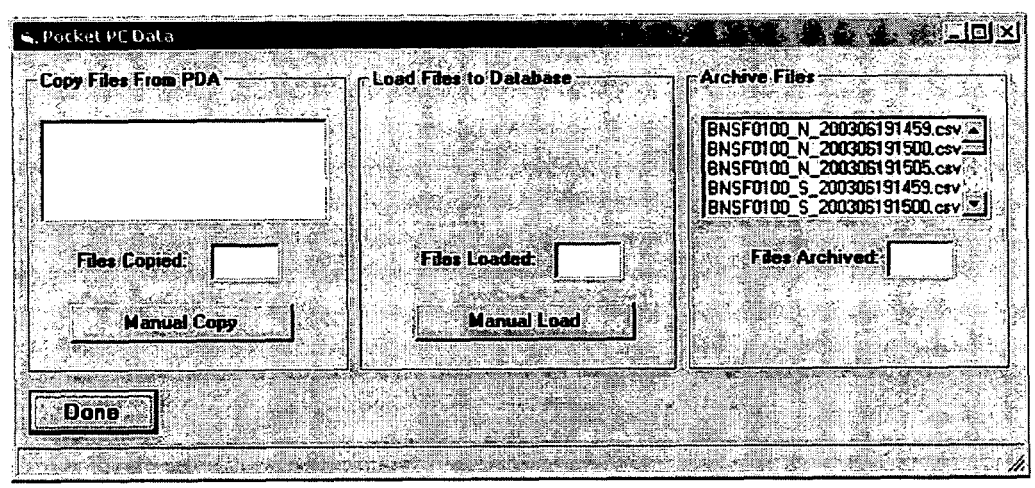

Selection of the iPaq menu 111 (iPaq is a popular Pocket PC device manufactured by Hewlett-Packard Company, and is used here synonymously with "Pocket PC"), causes a dialog box such as that shown in FIG. 25 to appear, which can be used to manually retrieve data from the Pocket PC, similar to the manner in which the data is retrieved through the synchronization procedure 105, 106, 107, and 108.

Figure 26:
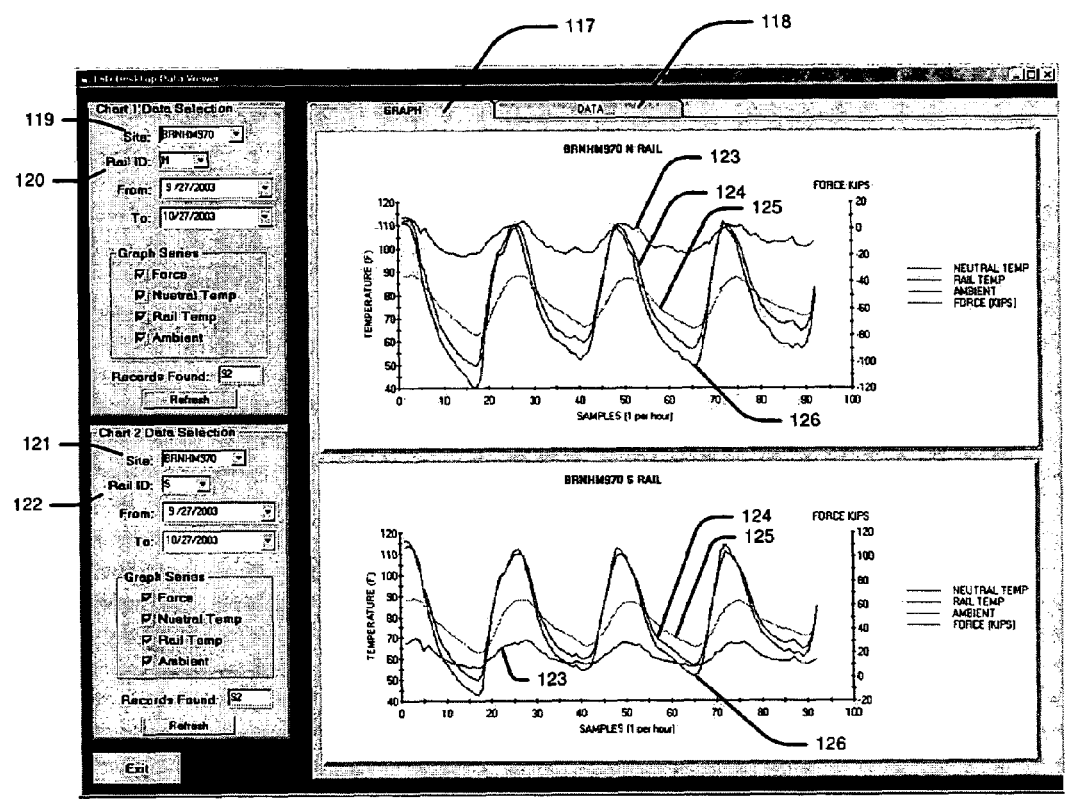

Selecting the View menu 112 provides the option to view the data in the Subdivisions and Sites tables, which are illustrated as part of the database in FIG. 22, and also to view and/or chart data from one or more sites in a manner shown in FIG. 26. The data viewing screen in FIG. 26 allows both the graphical display 117 and text-grid display 118 of data for two different rails. The rails displayed may simply be the north and south rails from the same Site, as is shown in FIG. 26, or the rails may from different sites. By selecting the Site drop down menus 119 and 121 and the Rail ID drop-down menus 120 and 122, the user can select the desired data for display. As shown in FIG. 26, graphs of the neutral temperature 123, the rail temperature 124, and the ambient temperature 125 over time may be displayed for each of the displayed rails. The force on the rail 126 may also be displayed, if desired.

Note that in FIG. 26, the neutral temperature of the track tends to vary over a twenty-four hour period, rising as the ambient temperature rises, and falling as the ambient temperature falls. Normally, rail is installed so that it is securely fastened to the ground, and is given little, if any, room to move. For a given portion of rail, if completely secured to the ground, the neutral temperature would, theoretically, not fluctuate during the day. However, where the neutral temperature does fluctuate, it may be an indication that the track has some room to relieve some axial forces that it is subject to, and presumably may not be completely secured. In some cases, a track may be insufficiently secured to the ground, or loose, which is a condition that can cause problems for railroads, and perhaps additional safety issues. Thus, it may be useful to monitor the extent to which the neutral temperature of a given track fluctuates during the day. And accordingly, by so monitoring, some of the embodiments and systems described herein may also be used to detect not only the internal forces in the rail, but also the extent to which the rail is securely attached to the ground.

Some of the data displayed herein is taken from experimental systems and test systems, and may not represent actual readings from any particular rail. Further, to the extent the data is from experimental systems and test systems, it should be understood that the data shown or described herein may not fall within ranges found in actual practice. Further, data shown in one figure may not be consistent with data shown in another figure, and this disclosure should be read by one skilled in the art by keeping mind that any data shown is merely illustrative.

Appendices A, B, and C are lists of files containing source code for three applications. Appendix A is a list of files from an application designed to execute on a data logger module (Adam-5510), and is written in C. Appendix B is a list of files for an application written in Microsoft Embedded Visual C++ that executes on a Pocket PC handheld device. Appendix B is a list of files for a Microsoft Windows desktop application written in Visual Basic. The software in these appendices can be used in a Pocket PC-based wireless neutral temperature measurement system, as is described herein, particularly in connection with FIG. 16 to FIG. 26.

It should be understood that the various techniques and features that have been described or otherwise disclosed herein can be implemented separately, combined with other techniques and features, or used in conjunction with each other. In other words, it is intended that the various techniques and features described in connection with implementations illustrated in the drawings, illustrated in the subject matter incorporated by reference, or otherwise illustrated can be used alone or can be combined with other techniques and/or features, even if such techniques and/or features are not shown being used as such.

Generally, although the inventions disclosed herein have been shown and described with respect to specific embodiments and/or implementations, various changes and modifications, even if not shown or specifically described herein, may be applicable, and are deemed to lie within the spirit and scope of the inventions disclosed herein as defined by the claims. Any specific features or aspects of the embodiments or implementations described or illustrated herein are not intended to limit the present invention in a manner not specifically and explicitly required by the claims.

What is claimed is:

1. A method for monitoring the neutral temperature of a railway rail, the method comprising the acts of:
   installing at a rail site a field sensor system to collect data relating to the neutral temperature of a rail at the rail site;
   logging a first set of data relating to the neutral temperature of the rail at the rail site;
   collecting the first set of logged data relating to the neutral temperature of the rail using a data collection device;
   storing the first set of logged data relating to the neutral temperature of the rail on a storage medium;
   logging a second set of data relating to the neutral temperature of the rail at the rail site;
   collecting the second set of logged data relating to the neutral temperature of the rail using the data collection device;
   storing the second set of logged data relating to the neutral temperature of the rail on the storage medium; and
   accessing the storage medium and analyzing the first set of logged data and the second set of logged data by displaying a representation of the data on a display screen.

2. The method of claim 1, wherein the act of installing at a rail site a field sensor system includes the act of:
   calibrating a component of the field sensor system.

3. The method of claim 2, wherein the act of calibrating a component of the field sensor system includes the act of:
   establishing the initial neutral temperature of the rail at the rail site.

4. The method of claim 3, further comprising the act of:
   calculating the neutral temperature of the rail based on the first set of logged data.

5. The method of claim 4, further comprising the act of:
   calculating the neutral temperature of the rail based on the second set of logged data.

6. The method of claim 1, further comprising the act of:
   calculating the difference between the neutral temperature of the rail based on the first set of data and the neutral temperature of the rail based on the second set of data.

7. A method for monitoring the neutral temperature of a railway rail, the method comprising the acts of:
   installing at a first rail site a first field sensor system to collect data relating to the neutral temperature of a rail at the first rail site;
   installing at a second rail site a second field sensor system to collect data relating to the neutral temperature of a rail at the second rail site;
   logging a first set of data relating to the neutral temperature of the rail at the first rail site;
   logging a second set of data relating to the neutral temperature of the rail at the first rail site;
   collecting, at a data collection unit, the first set of data and the second set of data relating to the neutral temperature of the rail at the first rail site, where the first field sensor system communicates with the data collection unit through a wireless interface;
   logging a first set of data relating to the neutral temperature of the rail at the second rail site;
   logging a second set of data relating to the neutral temperature of the rail at the second rail site;
   collecting, at the data collection unit, the first set of data and the second set of data relating to the neutral temperature of the rail at the second rail site, where the data collection unit receives the first set of data and the second set of data relating to the neutral temperature of the rail at the second rail site through a wireless interface; and analyzing, at an analysis location that is not at the first rail site and that is not at the second rail site, the first set of data relating to the neutral temperature of the rail at the first rail site and the second set of data relating to the neutral temperature of the rail at the first rail site to determine the condition of the rail at the first rail site.

8. The method of claim 7, where the act of collecting the first set of data and the second set of data relating to the neutral temperature of the rail at the first rail site is carried out automatically without requiring intervention by data collection personnel, and where the act of collecting the first set of data and the second set of data relating to the neutral temperature of the rail at the second rail site is carried out automatically without requiring intervention by data collection personnel.

9. The method of claim 7, where the act of installing at a first rail site a first field sensor system includes the act of calibrating a component of the first field sensor system.

10. The method of claim 9, where the act of calibrating a component of the first field sensor system includes establishing the initial neutral temperature of the rail at the first rail site.

11. The method of 10, further comprising the act of:

analyzing, at the analysis location, the first set of data and the second set of data relating to the neutral temperature of the rail at the second rail site.

12. A system for monitoring the neutral temperature of a railway rail, the system comprising:

(a) a first field sensor system installed on a rail at a first railway site, where the first field sensor system is configured to collect data relating to the neutral temperature of the rail at the first railway site, where the first field sensor system logs a first set of data relating to the neutral temperature of the rail at the first railway site, and where the first field sensor system later logs a second set of data relating to the neutral temperature of the rail at the first railway site;

(b) a second field sensor system installed on a rail at a second railway site, where the second field sensor system is configured to collect data relating to the neutral temperature of the rail at the second railway site, where the second field sensor system logs a first set of data relating to the neutral temperature of the rail at the second railway site, and where the second field sensor system later logs a second set of data relating to the neutral temperature of the rail at the second railway site; and (c) a data collection unit that is configured to receive data relating to the neutral temperature of the rail at the first railway site and relating to the neutral temperature of the rail at the second railway site, where the data collection unit is not located at the first railway site and is not located at the second railway site, and where the data collection unit is configured to receive the first set of data relating to the neutral temperature of the rail at the first railway site and the second set of data relating to the neutral temperature of the rail at the first railway site to enable analysis of the condition of the rail at the first railway site.

13. The system of claim 12, where the data collection unit is configured to receive data through a wireless interface.

14. The system of claim 13, where the data collection unit is configured to receive data without assistance from data collection personnel.

15. The system of claim 14, where the data collection unit is further configured to receive data relating to the neutral temperature of the rail at the first railway site and relating to the neutral temperature of the rail at the second railway site to enable analysis of the condition of the rail at the first railway site and the condition of the rail at the second railway site.

16. The system of claim 15, further comprising:

(d) a computer configured to analyze the condition of the rail at the first railway site and the condition of the rail at the second railway site.

* * * * *